(12) United States Patent
Stein et al.

(10) Patent No.: US 8,934,735 B2
(45) Date of Patent: Jan. 13, 2015

(54) ORIENTED, SPATIO-SPECTRAL ILLUMINATION CONSTRAINTS FOR USE IN AN IMAGE PROGRESS

(75) Inventors: Andrew Neil Stein, Pittsburgh, PA (US); Jean-Francois Lalonde, Pittsburgh, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 370 days.

(21) Appl. No.: 13/606,644

(22) Filed: Sep. 7, 2012

(65) Prior Publication Data

US 2014/0072210 A1    Mar. 13, 2014

(51) Int. Cl.
*G06K 9/00* (2006.01)

(52) U.S. Cl.
USPC .............................. 382/286; 382/162; 382/168

(58) Field of Classification Search
None
See application file for complete search history.

(56) References Cited

U.S. PATENT DOCUMENTS

| | | | |
|---|---|---|---|
| 7,596,266 B2 | 9/2009 | Maxwell et al. | 382/167 |
| 7,672,530 B2 | 3/2010 | Friedhoff et al. | 382/266 |
| 7,873,219 B2 | 1/2011 | Friedhoff et al. | 382/199 |
| 7,995,058 B2 | 8/2011 | Smith et al. | 345/426 |
| 8,139,867 B2 | 3/2012 | Maxwell et al. | 382/118 |
| 2007/0076977 A1* | 4/2007 | Chen et al. | 382/276 |
| 2010/0142805 A1* | 6/2010 | Maxwell et al. | 382/164 |
| 2010/0142818 A1* | 6/2010 | Stein et al. | 382/173 |
| 2010/0142825 A1* | 6/2010 | Maxwell et al. | 382/199 |
| 2010/0142846 A1* | 6/2010 | Tolliver et al. | 382/274 |
| 2010/0278448 A1* | 11/2010 | Friedhoff et al. | 382/274 |
| 2012/0114232 A1 | 5/2012 | Smith | 382/165 |
| 2013/0156329 A1* | 6/2013 | Szeliski et al. | 382/218 |
| 2014/0294296 A1* | 1/2014 | Lalonde | 382/164 |
| 2014/0050399 A1* | 2/2014 | Lalonde et al. | 382/168 |

OTHER PUBLICATIONS

Hooke & Jeeves, "Direct Search Solution of Numerical and Statistical Problems," Journal of the ACM, vol. 8, pp. 212-229, Apr. 1961.
Kirkpatrick, Gelatt, and Vecchi, "Optimization by Simulated Annealing," Science 220 (1983) 671-680.
Reeves, ed., Modern Heuristic Techniques for Combinatorial Problems, Wiley (1993).

* cited by examiner

*Primary Examiner* — Sean Motsinger
(74) *Attorney, Agent, or Firm* — Davidson, Davidson & Kappel, LLC

(57) ABSTRACT

In a first exemplary embodiment of the present invention, an automated, computerized method is provided for processing an image. According to a feature of the present invention, the method comprises the steps of providing an image represented in a spatial plane, organizing spatio-spectral information for the image in a matrix equation expressed by normal and tangential constraints determined as a function of a spatial orientation of selected image locations, relative to the spatial plane of the image and utilizing the matrix equation to solve for an intrinsic image corresponding to the image.

24 Claims, 34 Drawing Sheets

Selecting colors from an image

Figure 2: Pixel Array for Storing Image Data

| P(1, 1) | P(1, 2) | ... | P(1, M) |
| P(2, 1) | P(2, 2) | | |
| P(3, 1) | P(3, 2) | | |
| . | | | |
| . | | | |
| . | | | |
| P(N, 1) | ... | | P(N, M) |

Image File 18

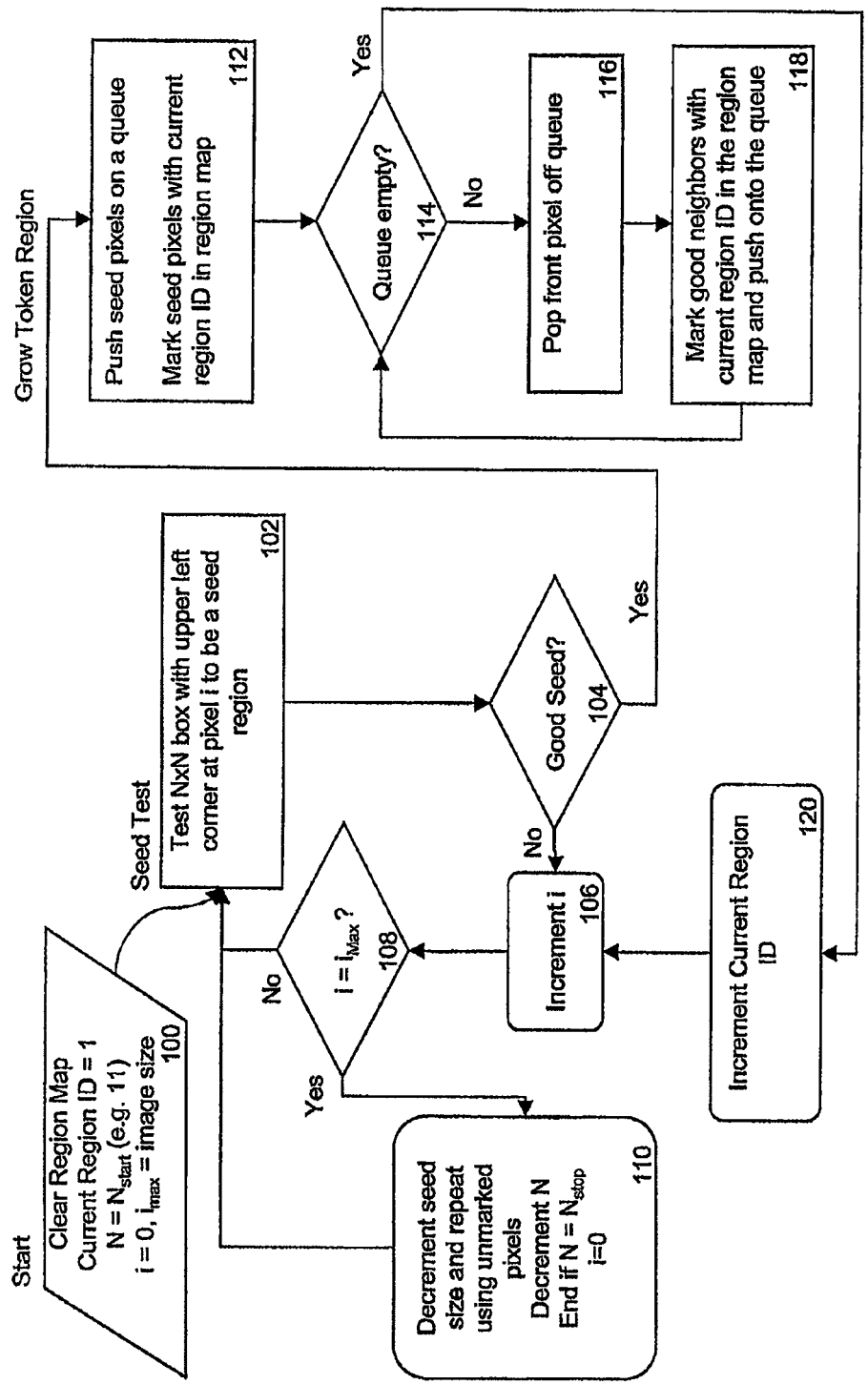
Figure 3A: Identifying Token Regions in an Image

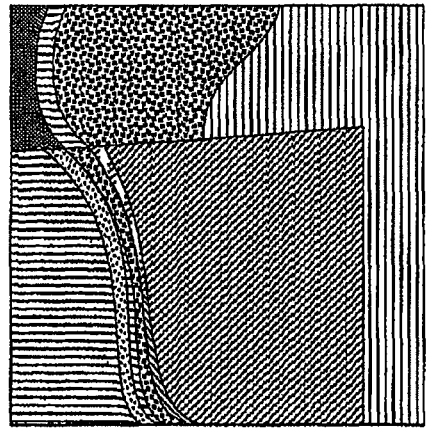
Figure 3C: Token Regions
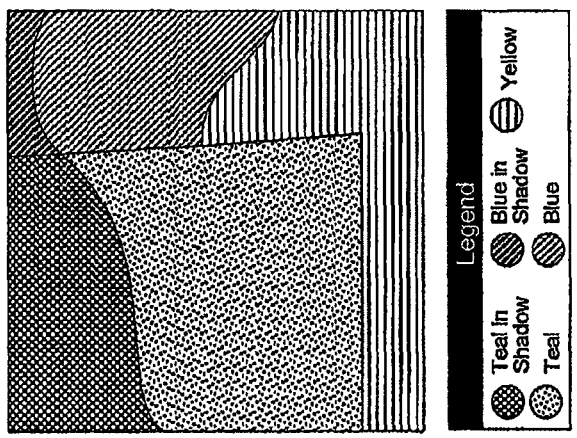
Figure 3B: Original Image
Figure 3B, 3C: Examples of Identifying Token Regions in an Image

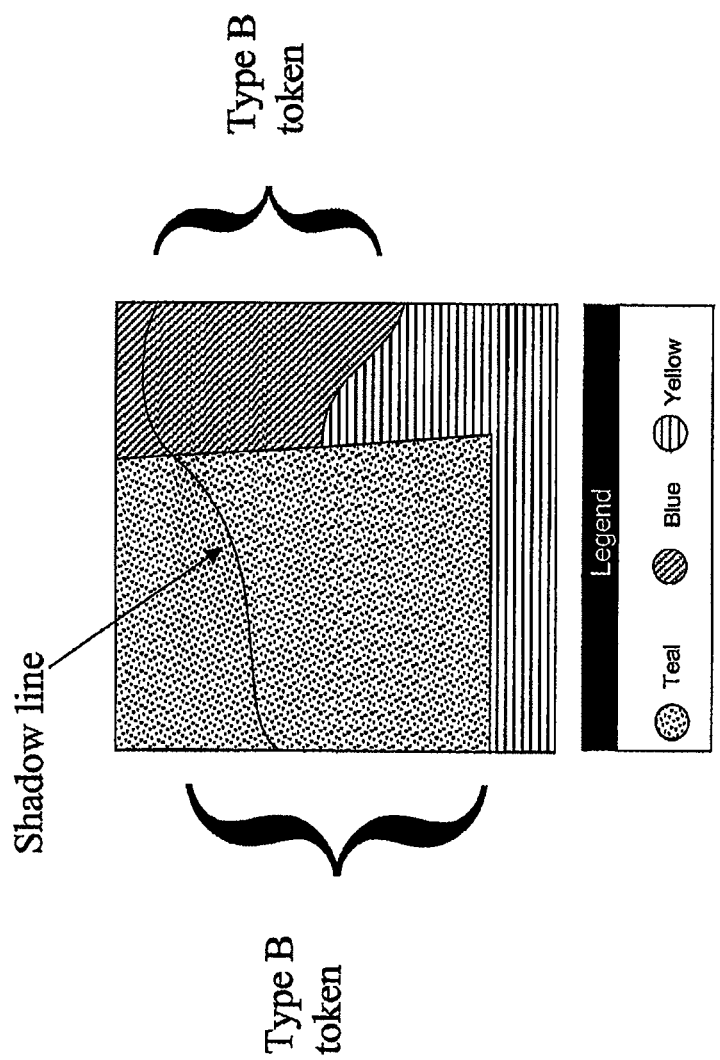
Figure 3D: Type B Tokens

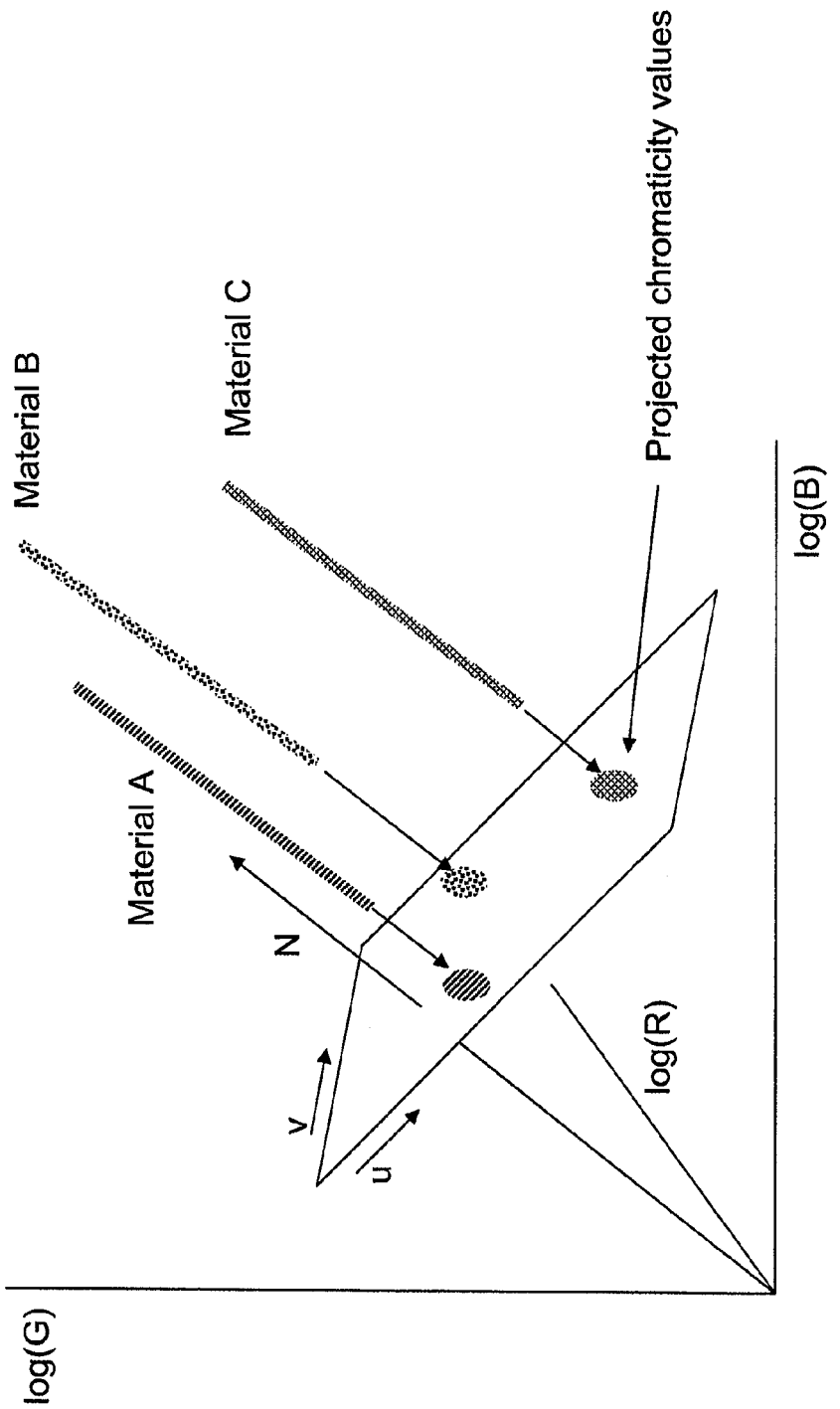
Figure 5: Log Color Space Chromaticity Plane

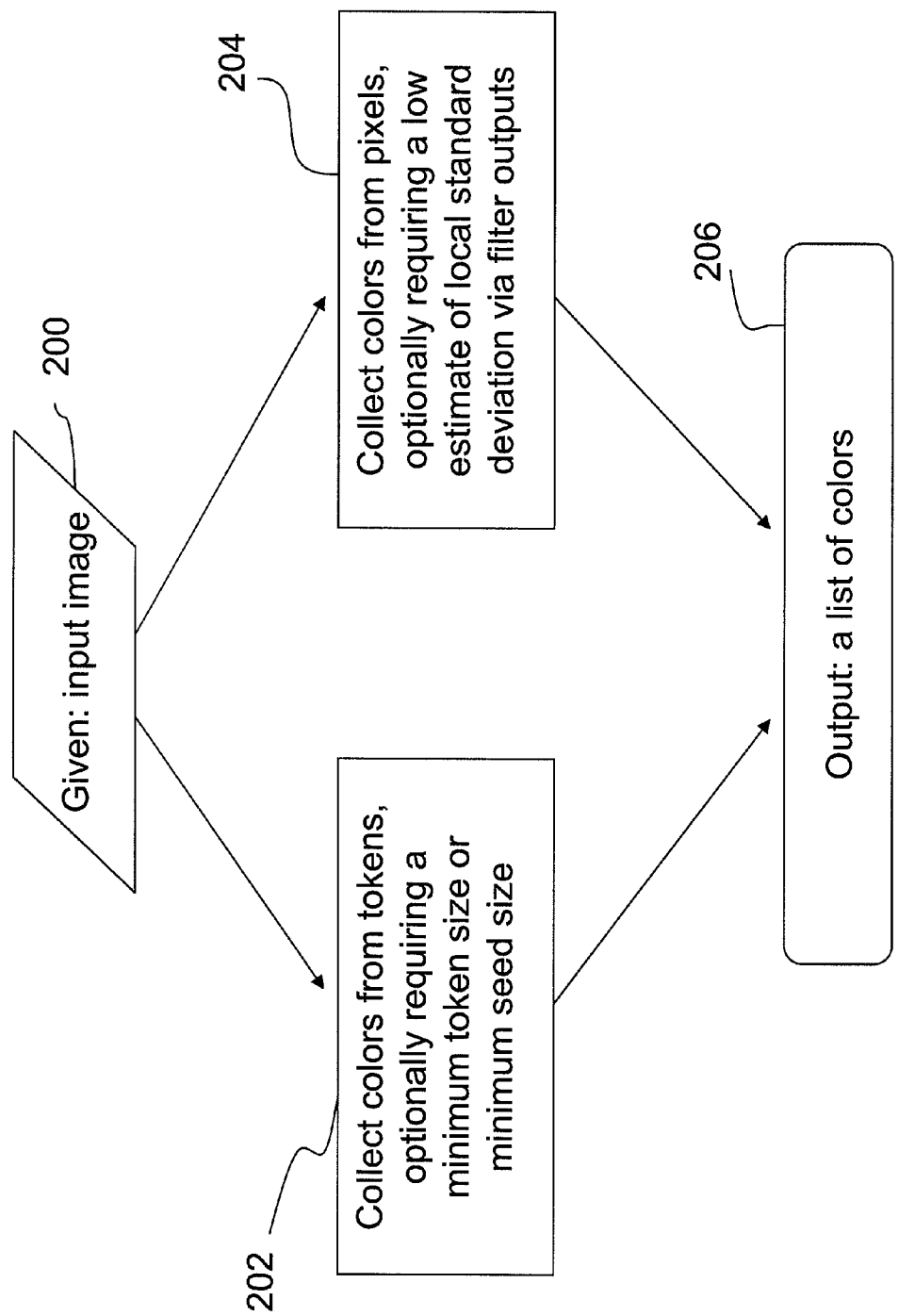
Figure 6: Selecting colors from an image

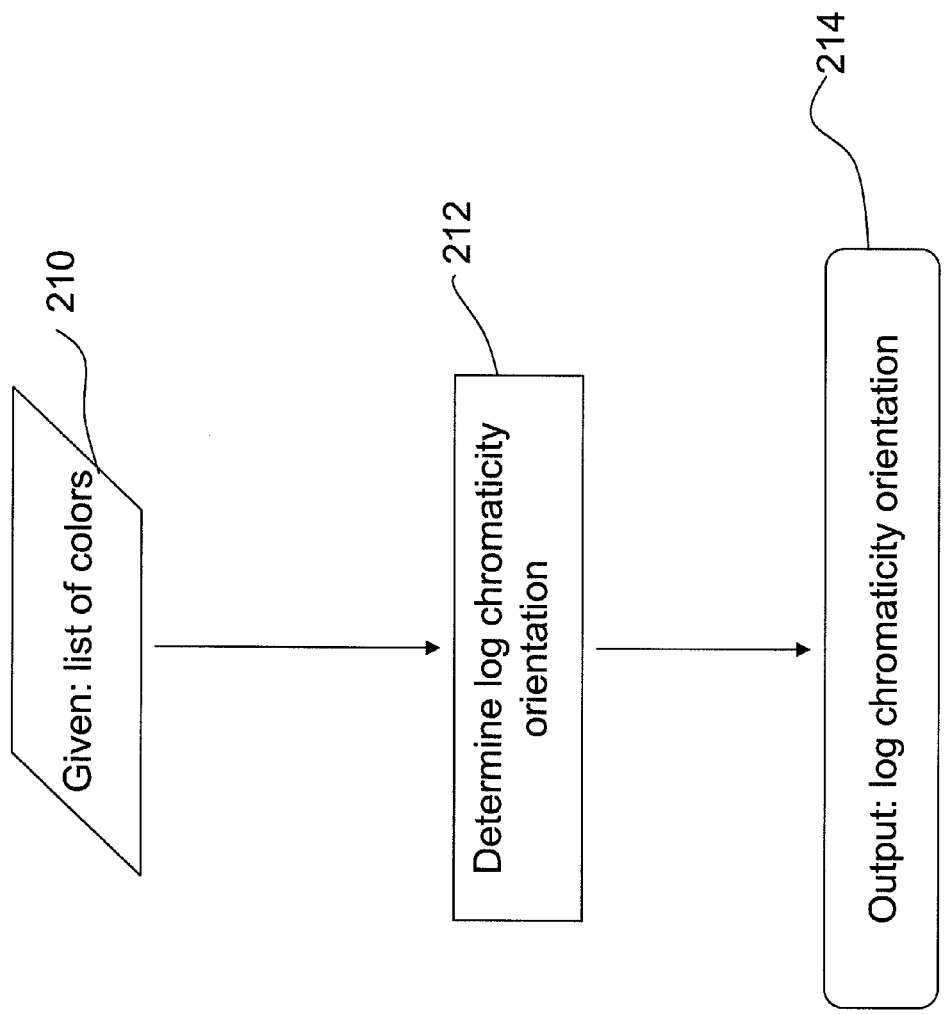
Figure 7A: Determining the log chromaticity orientation

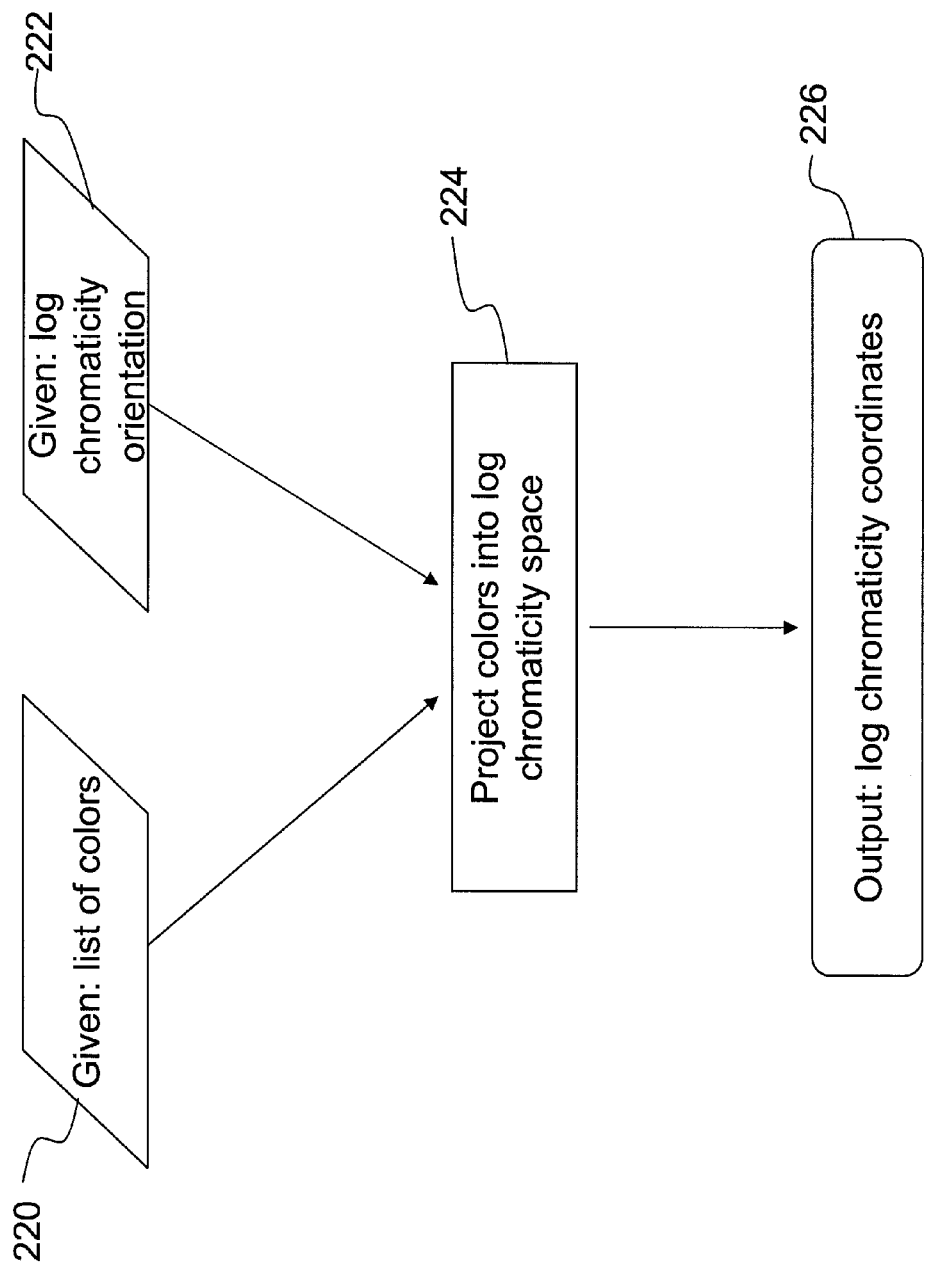
Figure 8: Determining log chromaticity coordinates

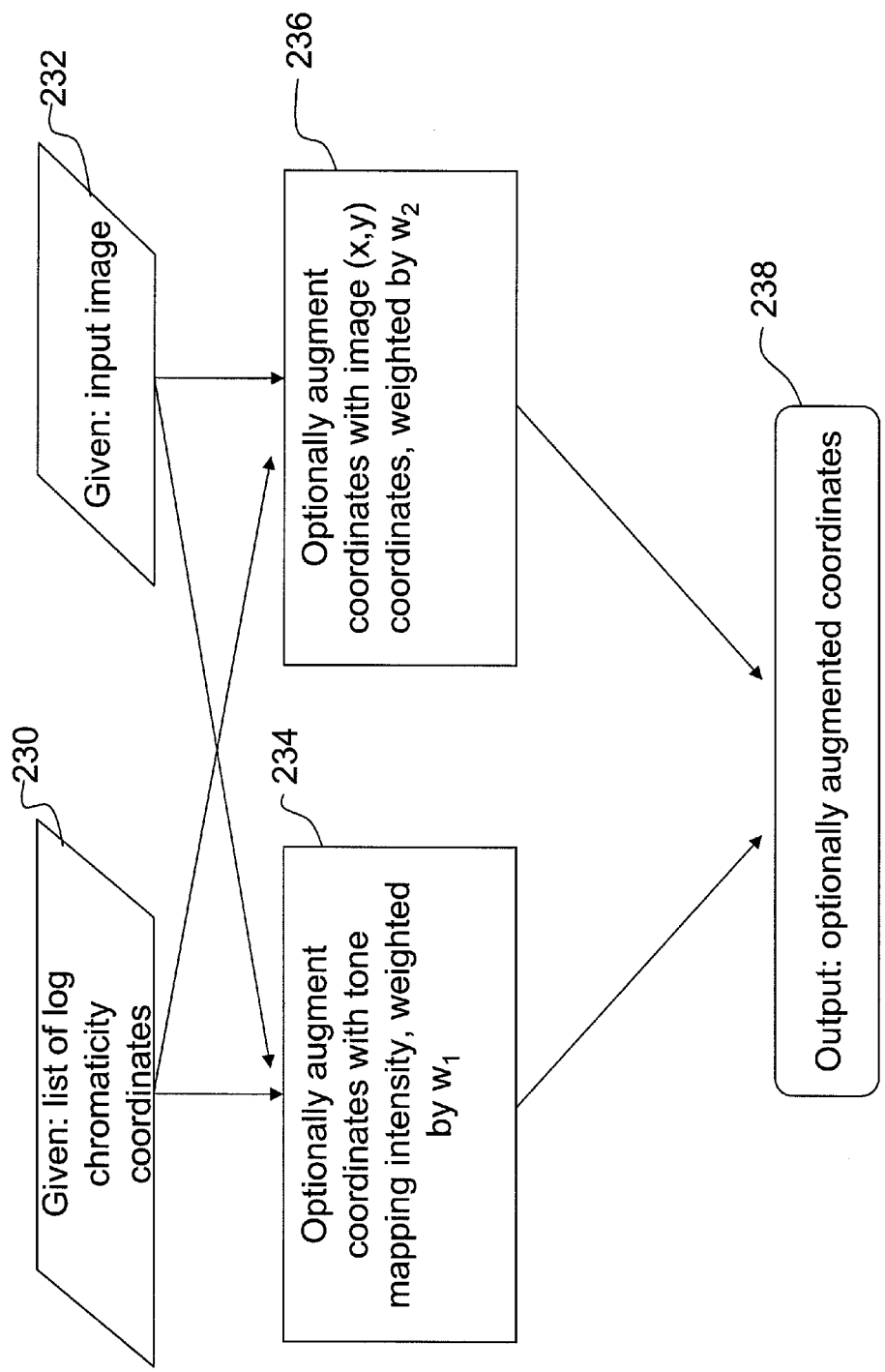
Figure 9: Optionally augmenting log chromaticity coordinates

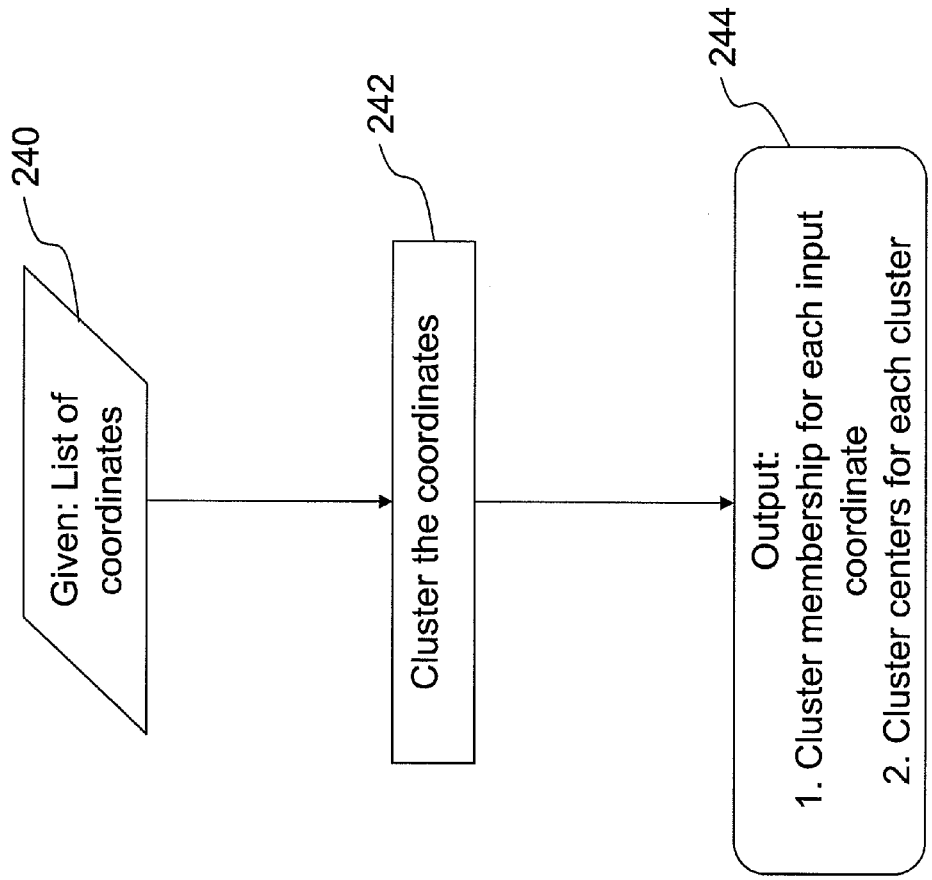
Figure 10: Clustering log chromaticity coordinates

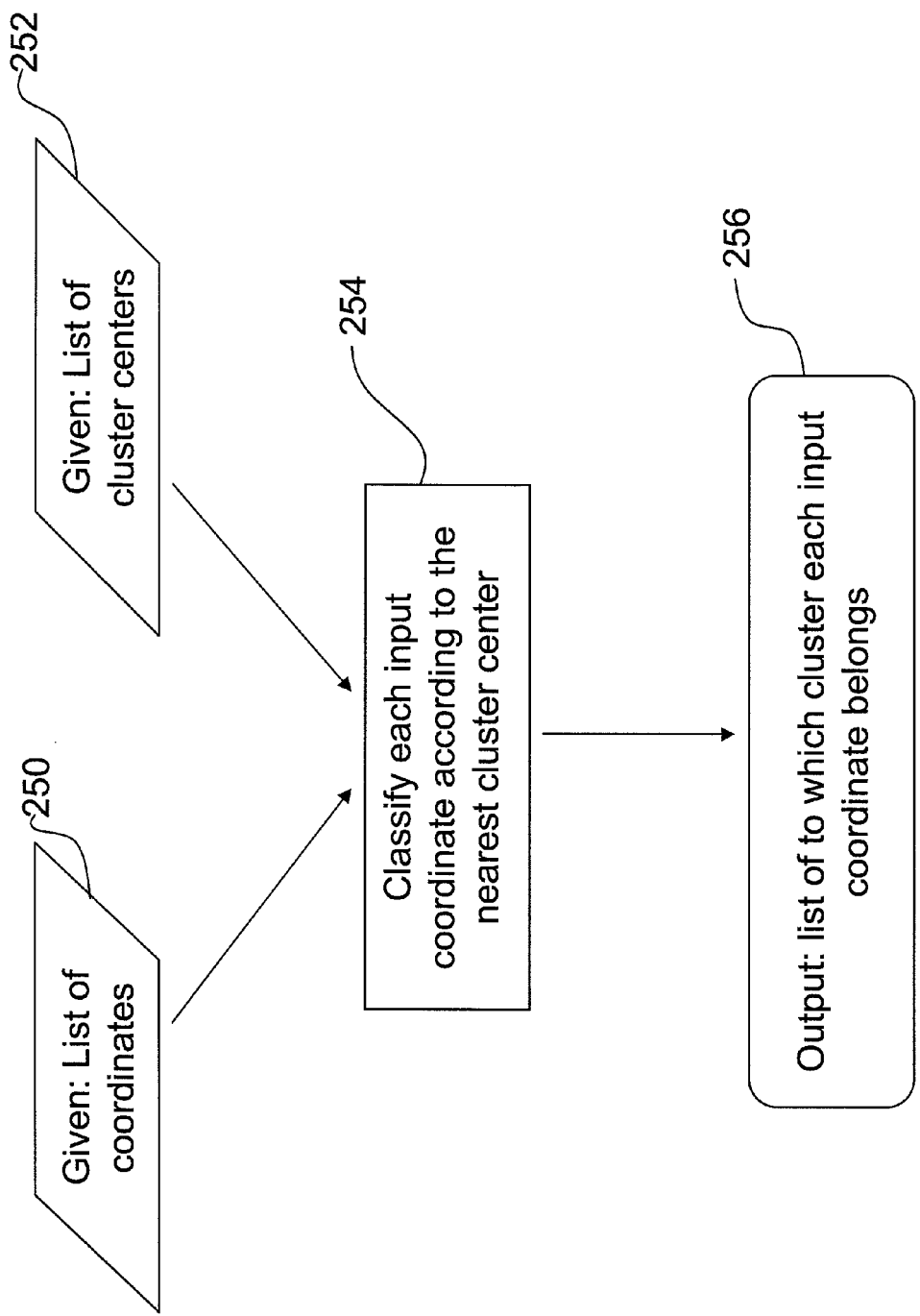
Figure 11: Assigning coordinates to clusters

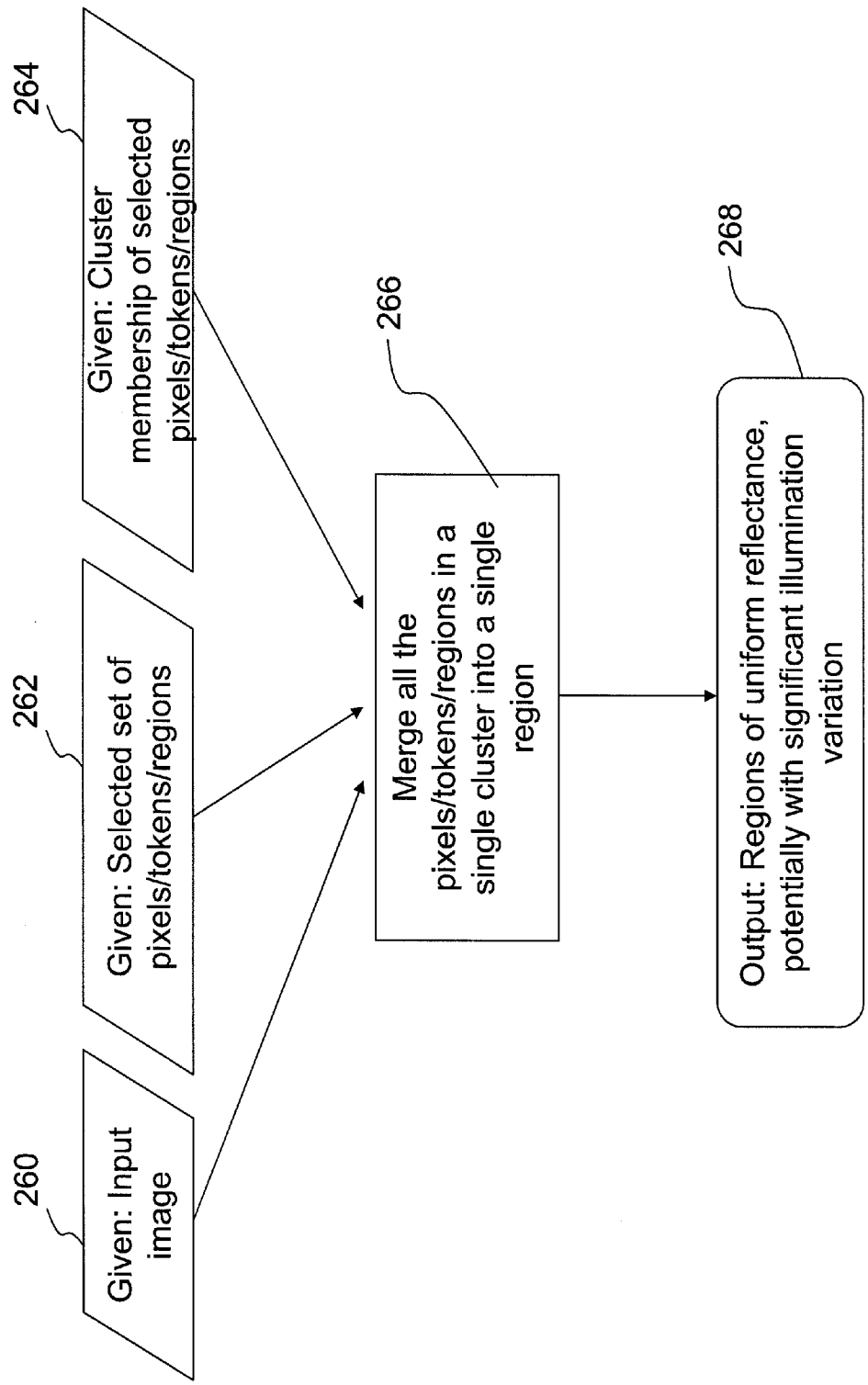
Figure 12: Detecting regions of uniform reflectance based on log chromaticity clustering $$\begin{bmatrix} 1 & -1 & 0 \\ 1 & 0 & -1 \\ 0 & 1 & -1 \end{bmatrix} \begin{bmatrix} I_a \\ I_b \\ I_c \end{bmatrix} = \begin{bmatrix} i_a - i_b \\ i_a - i_c \\ i_b - i_c \end{bmatrix}$$

[A]     [x]  =   [b]

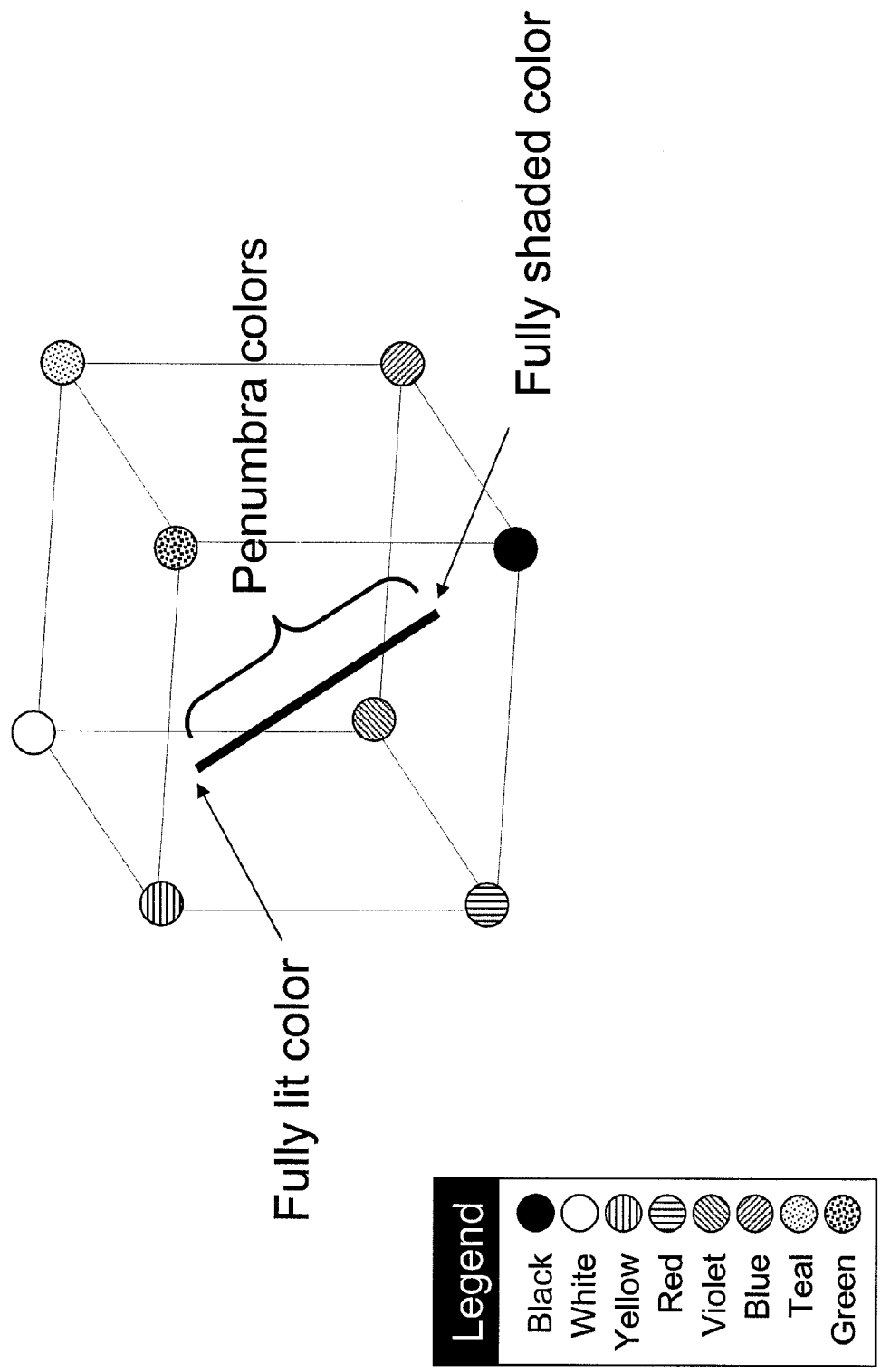
Figure 18: Representation of Body Reflection in RGB Space

ORIENTED, SPATIO-SPECTRAL ILLUMINATION CONSTRAINTS FOR USE IN AN IMAGE PROGRESS

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides an improvement and enhancement to the fundamental teachings of the Friedhoff Patents, and includes a method and system comprising image techniques that accurately and correctly generate intrinsic images, including techniques to provide increased accuracy and precision in the determination of image characteristics used in the generation of the intrinsic images.

In a first exemplary embodiment of the present invention, an automated, computerized method is provided for processing an image. According to a feature of the present invention, the method comprises the steps of providing an image represented in a spatial plane, organizing spatio-spectral information for the image in a matrix equation expressed by normal and tangential constraints determined as a function of a spatial orientation of selected image locations, relative to the spatial plane of the image and utilizing the matrix equation to solve for an intrinsic image corresponding to the image.

In a second exemplary embodiment of the present invention, a computer system is provided. The computer system comprises a CPU and a memory storing an image file providing an image represented in a spatial plane, the CPU is arranged and configured to execute a routine to organize spatio-spectral information for the image in a matrix equation expressed by normal and tangential constraints determined as a function of a spatial orientation of selected image locations, relative to the spatial plane of the image and utilize the matrix equation to solve for an intrinsic image corresponding to the image.

In a third exemplary embodiment of the present invention, a computer program product, disposed on a non-transitory computer readable media is provided. The computer program product includes computer executable process steps operable to control a computer to: provide an image represented in a spatial plane, organize spatio-spectral information for the image in a matrix equation expressed by normal and tangential constraints determined as a function of a spatial orientation of selected image locations, relative to the spatial plane of the image and utilize the matrix equation to solve for an intrinsic image corresponding to the image.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIG. 3a is a flow chart for identifying Type C token regions in the image file of FIG. 2, according to a feature of the present invention.

FIG. 3b is an original image used as an example in the identification of Type C tokens.

FIG. 3c shows Type C token regions in the image of FIG. 3b.

FIG. 3d shows Type B tokens, generated from the Type C tokens of FIG. 3c, according to a feature of the present invention.

FIG. 5 is a graphic representation of a log color space chromaticity plane according to a feature of the present invention.

FIG. 6 is a flow chart for determining a list of colors depicted in an input image.

FIG. 8 is a flow chart for determining log-chromaticity coordinates for the colors of an input image, as determined through execution of the routine of FIG. 6.

FIG. 9 is a flow chart for augmenting the log-chromaticity coordinates, as determined through execution of the routine of FIG. 8.

FIG. 10 is a flow chart for clustering the log-chromaticity coordinates, according to a feature of the present invention.

FIG. 11 is a flow chart for assigning the log-chromaticity coordinates to clusters determined through execution of the routine of FIG. 10.

FIG. 12 is a flow chart for detecting regions of uniform reflectance based on the log-chromaticity clustering.

FIG. 18 is a graph in RGB color space showing colors for a material, from a fully shaded color value to a fully lit color value, as predicted by a bi-illuminant dichromatic reflection model.

DETAILED DESCRIPTION OF THE PREFERRED EMBODIMENTS

Figure 1:
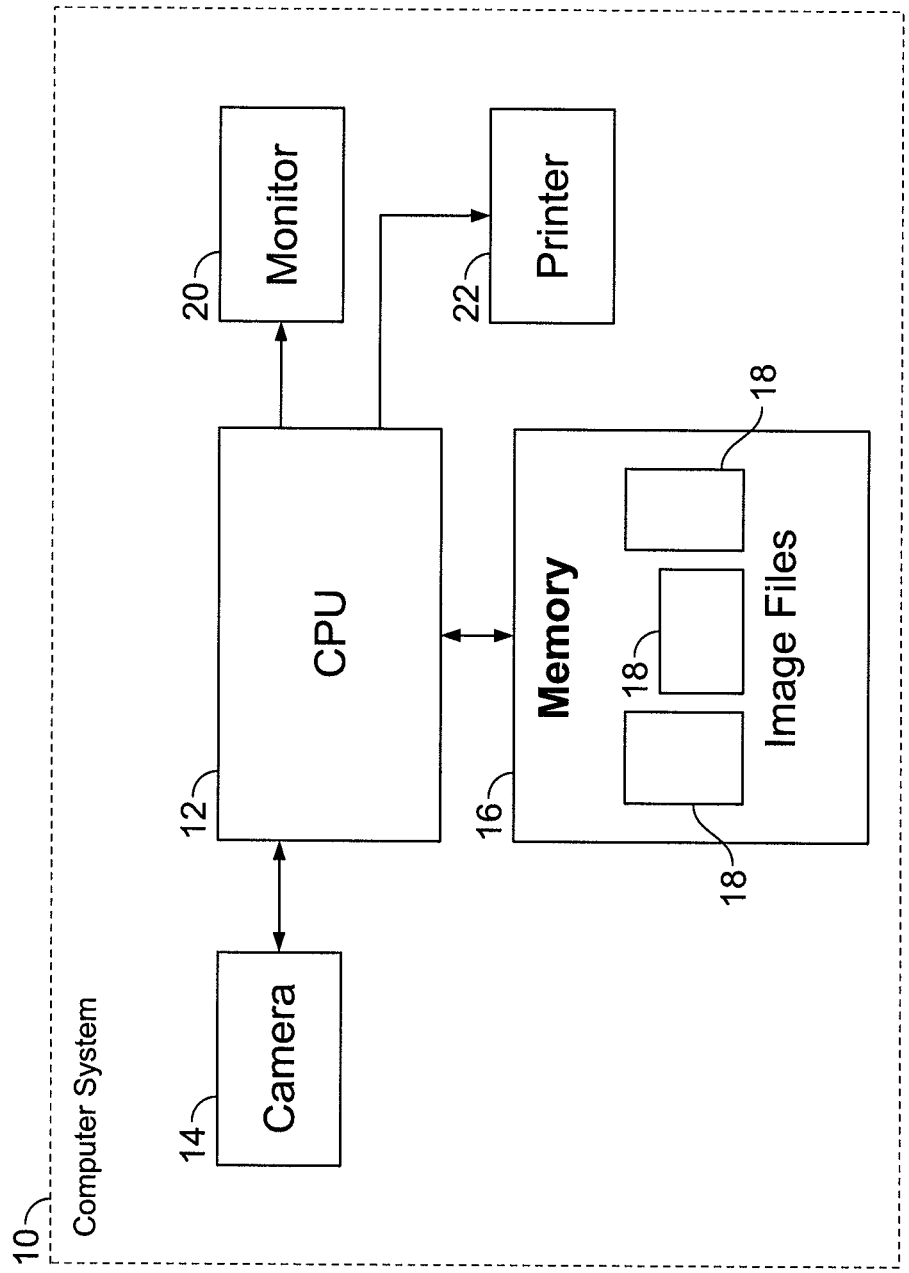
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, is that an image comprises two components, material and illumination. All changes in an image are caused by one or the other of these components. A method for detecting of one of these components, for example, material, provides a mechanism for distinguishing material or object geometry, such as object edges, from illumination and shadow boundaries.

Such a mechanism enables techniques that can be used to generate intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate further processing.

Pursuant to a feature of the present invention, processing is performed at a token level. A token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color. A Type C token comprises a connected image region of similar image properties among the contiguous pixels of the token, where similarity is defined with respect to a noise model for the imaging system used to record the image.

Referring now to FIG. 3a, there is shown a flow chart for identifying Type C token regions in the scene depicted in the image file 18 of FIG. 2, according to a feature of the present invention. Type C tokens can be readily identified in an image, utilizing the steps of FIG. 3a, and then analyzed and processed to construct Type B tokens, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer>0, for example it can be set at set at 11 or 15 pixels.

At step 102, a seed test is begun. The CPU 12 selects a first pixel, i=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of i (step 106), for example, i=2, pixel (1, 2), for a next N×N seed sample, and then tests to determine if $i=i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at $N=N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, for example, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4:
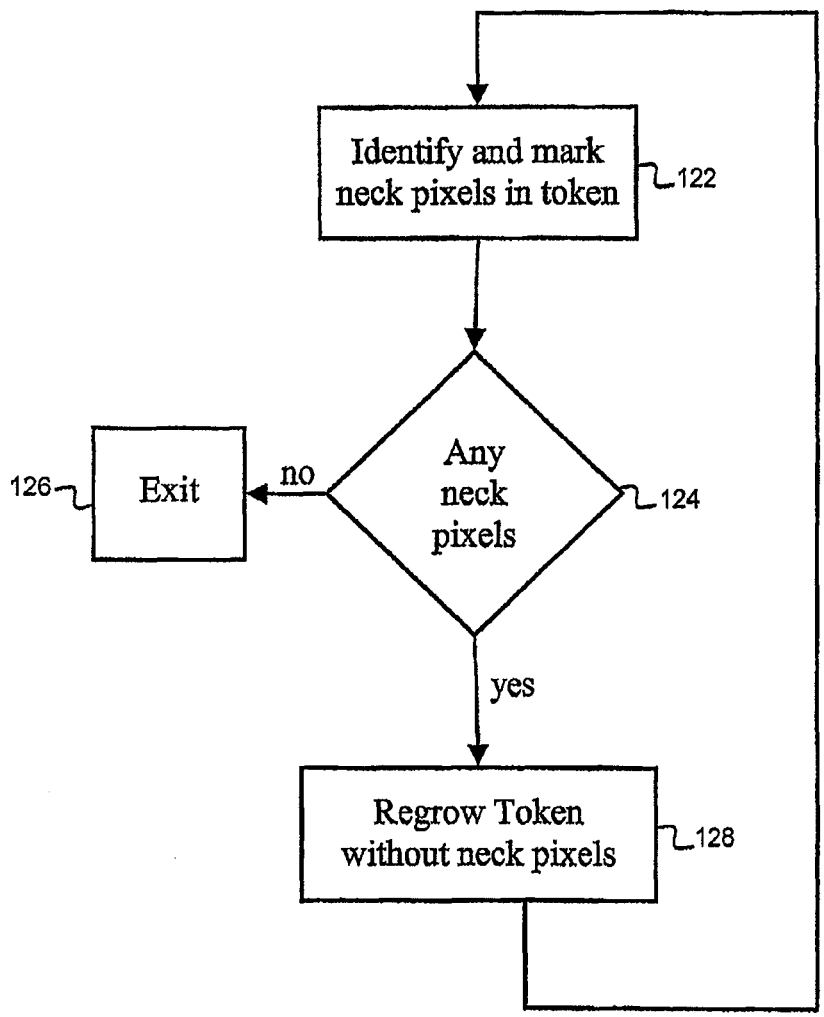
FIG. 4 is a flow chart for a routine to test Type C tokens identified by the routine of the flow chart of FIG. 3a, according to a feature of the present invention.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3a (step 126).

If yes, the CPU 12 proceeds to step 128 and operates to regrow the token from a seed location selected from among the unmarked pixels of the current token, as per the routine of FIG. 3a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 3d shows Type B tokens generated from the Type C tokens of FIG. 3c, according to a feature of the present invention. The present invention provides a novel exemplary technique using log-chromaticity clustering, for constructing Type B tokens for an image file 18. Log chromaticity is a technique for developing an illumination invariant chromaticity space.

A method and system for separating illumination and reflectance using a log-chromaticity representation is disclosed in U.S. Pat. No. 7,596,266, which is hereby expressly incorporated by reference. The techniques taught in U.S. Pat. No. 7,596,266 can be used to provide illumination invariant log-chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log-chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

FIG. 5 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as N=log $(Bright_{vector})-log(Dark_{vector})=log(1+1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in an image file 18 can be mapped by the CPU 12 from the image file value p(n, m, R, G, B) to a log value, then, through a projection to the chromaticity plane, to the corresponding u, v value, as shown in FIG. 5. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to the invention disclosed and claimed in related application Ser. No. 12/927,244, filed Nov. 10, 2010, entitled System and Method for Identifying Complex Tokens in an Image (expressly incorporated by reference herein and hereinafter referred to as "related invention"), published as US 2012/0114232, log-chromaticity values are calculated for each color depicted in an image file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log-chromaticity analysis.

FIG. 6 is a flow chart for determining a list of colors depicted in an input image, for example, an image file 18. In step 200, an input image file 18 is input to the CPU 12 for processing. In steps 202 and 204, the CPU 12 determines the colors depicted in the input image file 18. In step 202, the CPU 12 calculates an average color for each Type C token determined by the CPU 12 through execution of the routine of FIG. 3a, as described above, for a list of colors. The CPU 12 can be operated to optionally require a minimum token size, in terms of the number of constituent pixels of the token, or a minimum seed size (the N×N array) used to determine Type C tokens according to the routine of FIG. 3a, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the image. If blend pixels are present, relatively small Type C tokens, consisting of blend pixels, can be identified for areas of an image between two differently colored regions. By requiring a size minimum, the CPU 12 can eliminate tokens consisting of blend pixel from the analysis.

In step 204, the CPU 12 can alternatively collect colors at the pixel level, that is, the RGB values of the pixels of the input image file 18, as shown in FIG. 2. The CPU 12 can be operated to optionally require each pixel of the image file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 206, the CPU 12 outputs a list or lists of color (after executing one or both of steps 202 and/or 204). According to a feature of the related invention, all of the further processing can be executed using the list from either step 202 or 204, or vary the list used (one or the other of the lists from steps 202 or 204) at each subsequent step.

FIG. 7a is a flow chart for determining an orientation for a log-chromaticity representation, according to a feature of the related invention. For example, the CPU 12 determines an orientation for the normal N, for a log-chromaticity plane, as shown in FIG. 5. In step 210, the CPU 12 receives a list of colors for an input file 18, such as a list output in step 206 of the routine of FIG. 6. In step 212, the CPU 12 determines an orientation for a log-chromaticity plane.

As taught in U.S. Pat. No. 7,596,266, and as noted above, orientation of the chromaticity plane is represented by N, N being a vector normal to the chromaticity representation, for example, the chromaticity plane of FIG. 5. The orientation is estimated by the CPU 12 thorough execution of any one of several techniques. For example, the CPU 12 can determine estimates based upon entropy minimization, manual selection of lit/shadowed regions of a same material by a user or the use of a characteristic spectral ratio (which corresponds to the orientation N) for an image of an input image file 18, as fully disclosed in U.S. Pat. No. 7,596,266.

For a higher dimensional set of colors, for example, an RYGB space (red, yellow, green, blue), the log-chromaticity normal, N, defines a sub-space with one less dimension than the input space. Thus, in the four dimensional RYGB space, the normal N defines a three dimensional log-chromaticity space. When the four dimensional RYGB values are projected into the three dimensional log-chromaticity space, the projected values within the log-chromaticity space are unaffected by illumination variation.

In step 214, the CPU 12 outputs an orientation for the normal N. As illustrated in the example of FIG. 5, the normal N defines an orientation for a u, v plane in a three dimensional RGB space.

Figure 7B:
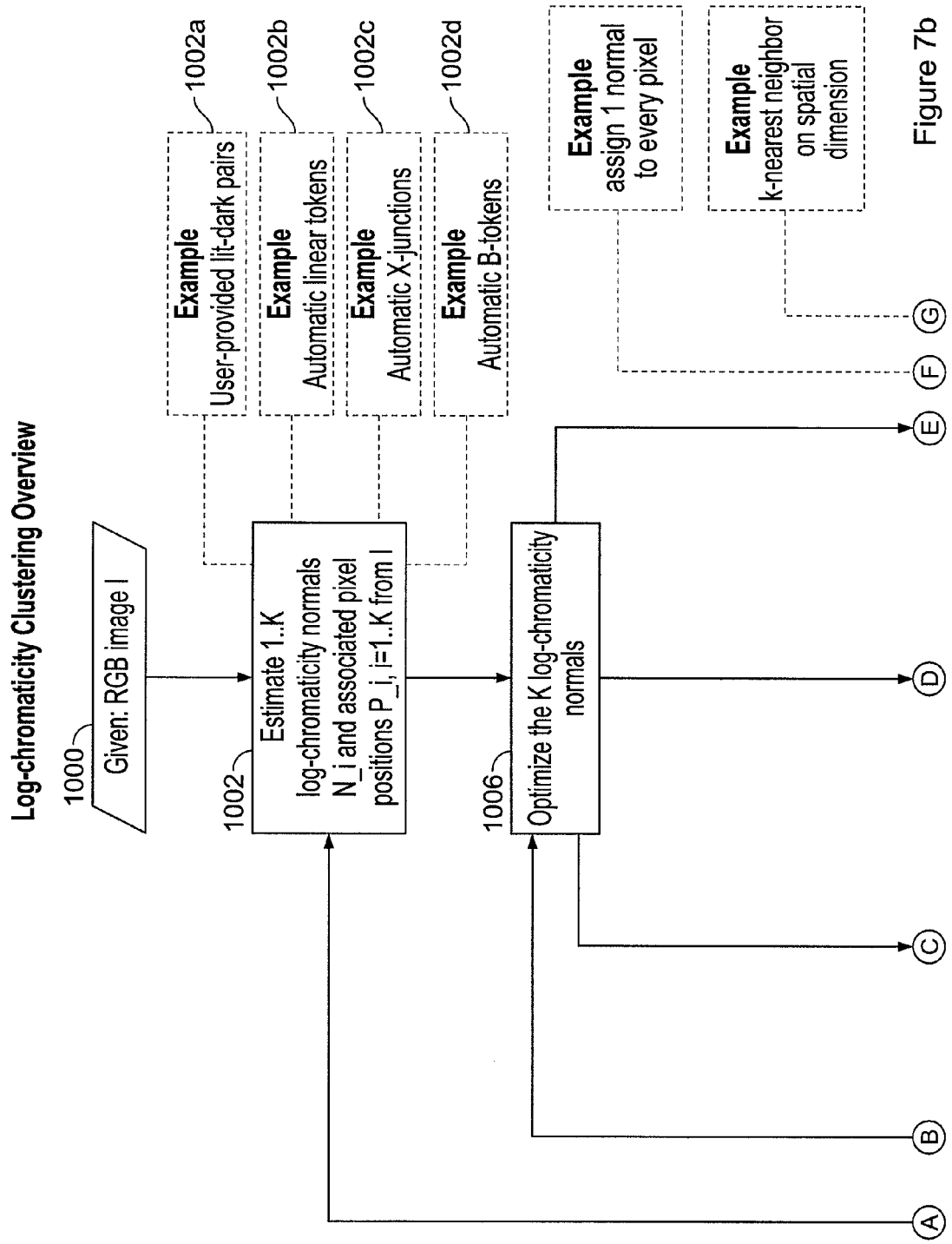
FIG. 7b is a flow chart for an additional exemplary embodiment of the present invention, for determining an optimized orientation for a log-chromaticity space.
Figure 7B:
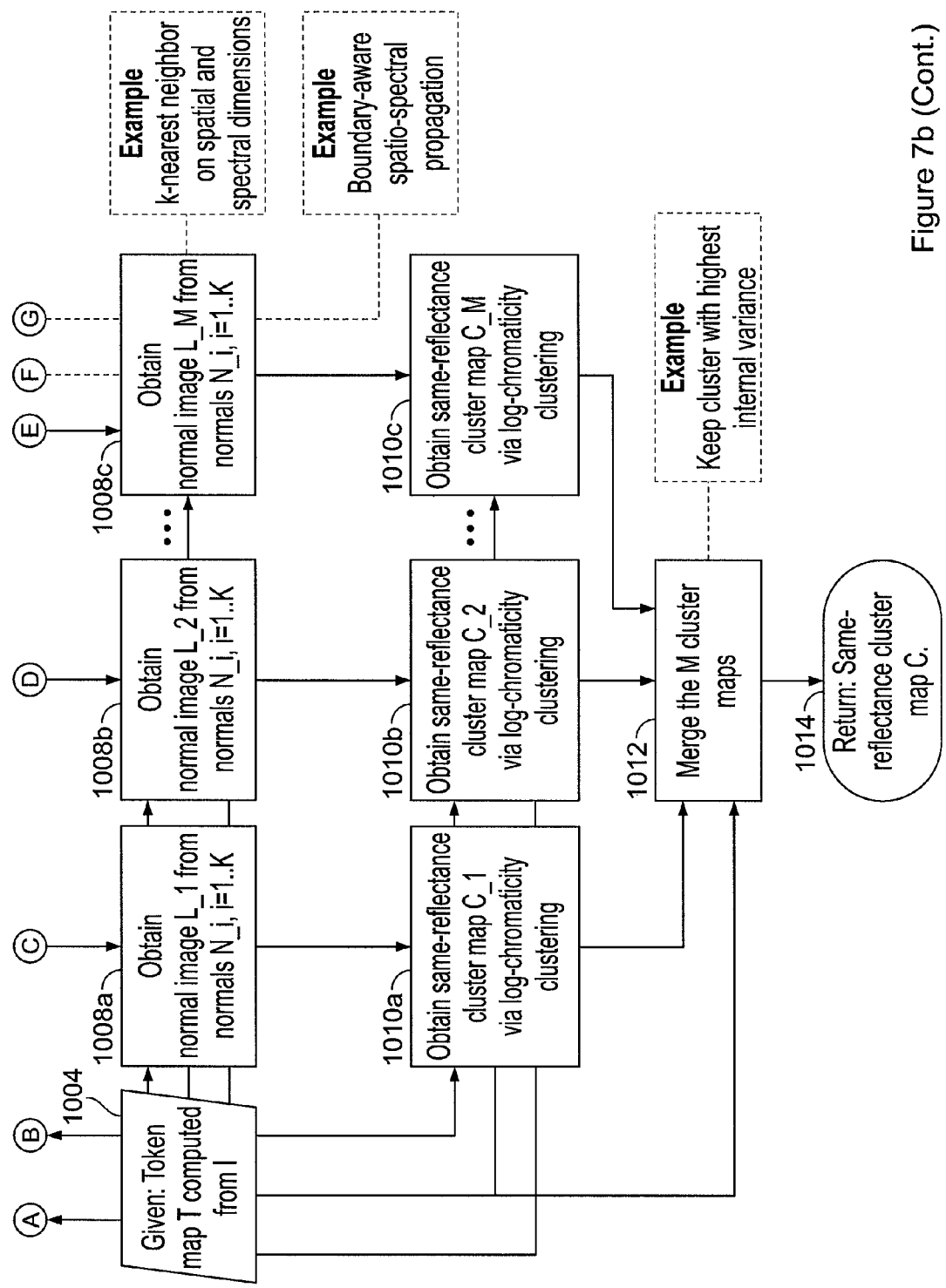
Figure 7:
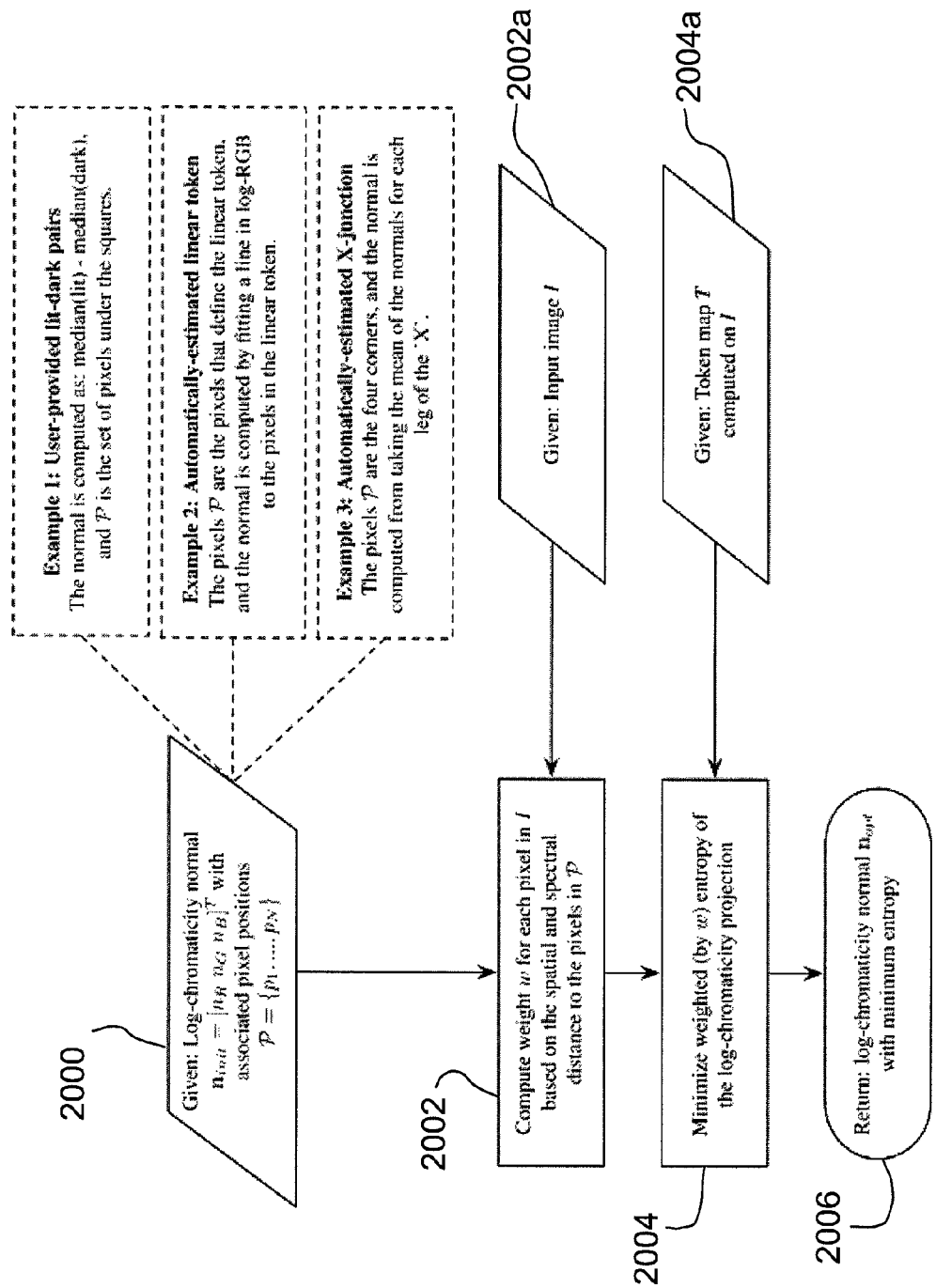
FIG. 7a is a flow chart for determining an orientation for a log-chromaticity space.
FIG. 7c is a flow chart for a log-chromaticity normal optimization technique, according to a feature of the present invention.
FIG. 7d is a flow chart for implementing a log-chromaticity normal optimization technique when a normal is estimated based upon a user selected lit-dark pairs of pixel blocks.
FIG. 7e is a flow chart illustrating an entropy minimization technique according to a feature of the present invention.
FIG. 7f is a flow chart showing the use of a system of linear equations to estimate spatially varying normals.
FIG. 7g shows an example of a token map having four tokens for use in the system of linear equations of FIG. 7f.
FIG. 7h is a flow chart for a multi-clustering merge step.

According to further exemplary embodiments of the present invention, processing techniques are implemented to provide increased accuracy and precision in the determination of the normal, N, and, further, to calculate spatially varying log-chromaticity normals, to account for varying conditions that can exist in a scene depicted in an image file 18. FIG. 7b shows a flow chart for improving accuracy in the generation of illumination invariant (same reflectance) log-chromaticity representation values for each color of the image using one or more normals, N, to orient the log-chromaticity plane.

In step 1000, an image file 18 is input to the CPU 12, for example, the input file 18 processed in the routine of FIG. 6. In step 1002, one or more values (1–K) for the normal N are either automatically estimated by the CPU 12 and/or provided by user input, as shown in sub-steps 1002a-d. Each normal is associated with corresponding pixel positions for the pixels used to calculate the respective normal, N, for example, from among pixels p(1, 1) to p(n, m) of an image file 18 being processed, as shown in FIG. 2.

To implement sub-step 1002a, a user designates, for example, via a touch screen action, one or more sets of lit-dark pairs of pixel blocks, the pairs each corresponding to lit and shadowed regions of a same material, respectively, depicted in the image of the image file 18 being processed. Each pixel block includes, for example, an n×n array of pixels. In sub-steps 1002b-d, the CPU 12 operates to automatically estimate one or more values for the normal, N.

For example, in step 1002b, the CPU 12 operates to identify linear tokens that are then used to estimate normal values. A linear token is a nonhomogeneous token comprising a connected region of the image wherein adjacent pixels of the region have differing color measurement values that fall within a cylinder in RGB space, from a dark end (in shadow) to a bright end (lit end) of a single material, along a positive slope (see, for example, FIG. 18, showing colors for a material, from a fully shaded color value to a fully lit color value, as predicted by a bi-illuminant dichromatic reflection model). The cylinder configuration is predicted by the bi-illuminant dichromatic reflection model (BIDR model).

As described above, the BIDR model predicts the correct colors for a material, in a shadow penumbra, from full shadow to fully lit. Each linear token, therefore, provides a candidate image region that likely corresponds to a set of pixels extending through a penumbra across a single material depicted in the image.

U.S. Pat. No. 7,995,058 discloses a technique for analyzing pixels of an image to identify contiguous pixels forming linear tokens throughout the image. In step 1002b, the CPU 12 is operated to execute the technique taught in U.S. Pat. No. 7,995,058, to identify a set of linear tokens in the image being processed.

As noted above, the orientation for the log-chromaticity plane is defined as $N=\log(1+1/S_{vector})$, wherein $S_{vector}$ is a characteristic spectral ratio defined as $S_{vector}=Dark_{vector}/(Bright_{vector}-Dark_{vector})$, with the vectors corresponding to, for example, the RGB values for a fully lit pixel (Bright) and a pixel in full shadow (Dark), respectively, for a material (see U.S. Pat. No. 7,596,266). Accordingly, the characteristic spectral ratio(s) for calculating a normal(s), N, for the log-chromaticity plane can be based upon color information provided by either one or both of the lit-dark pairs of pixel blocks selected by a user (step 1002a) and/or the pixels defining the linear tokens identified by the CPU 12 (step 1002b).

In the case of the lit-dark pairs of pixel blocks selected by a user, the CPU 12 can calculate an average color value, for example, a median, for each n×n block of pixels for each lit and dark pair selected by a user. The result is an average Bright color and Dark color for each selected pair. The CPU 12 then proceeds to use the average values to calculate an $S_{vector}$ based N value for each pair executing the $N=\log(1+1/S_{vector})$ equation.

In the case of the identified linear tokens, in each case, the CPU 12 fits a line to a plot, for example, in an RGB space, of the pixels of the respective linear token (see, for example, FIG. 18). The slope of the line can be used to represent an $S_{vector}$. As in the previous example, the CPU 12 then proceeds to use the line slope information to calculate an $S_{vector}$ based N value for each linear token.

Steps 1002c and d provide additional automatic methods for calculating a log-chromaticity plane orientation. In step 1002c, the automatic calculation is based upon X-junctions, and in step 1002d, the automatic calculation is based upon Type B tokens.

An X-junction is a region of an image wherein an illumination boundary crosses a material object boundary. Accordingly, each X-junction includes two materials, with each material including lit and shadowed regions, for example, as depicted by four adjacent Type C tokens. Type C tokens are identified by the CPU 12 via execution of the routine of FIG. 3a, as described above (step 1004).

U.S. Pat. No. 7,672,530 teaches a technique for automatically identifying X-junctions in an image by analysis of token neighbor relationships indicative of spatio-spectral features of an image. The CPU 12 is operated to implement the technique of U.S. Pat. No. 7,672,530 to perform iterations through Type C token neighbor relationships to identify a region where spectral ratios indicate a crossing of illumination and material object boundaries (for example spectral ratios based upon $Dark_{vector}/(Bright_{vector}-Dark_{vector})$, wherein the vectors are sample pixels from each side of a boundary between neighboring Type C tokens).

An average, for example, a median, for the spectral ratios along the illumination boundary of each identified X-junction is used as the $S_{vector}$ to calculate a normal N for each X-junction.

In step 1002d the automatic calculation is based upon Type B tokens, for example, as identified by the CPU 12 through execution of the routines of FIGS. 8-12, as will be described below. As noted above, each Type B token is a connected image region comprising contiguous pixels that represent a region of the image encompassing a single material in the scene. Thus, each type B token potentially covers a region of the image wherein one material extends from a fully lit end to an end in full shadow. Accordingly, a Type B token can be used to determine an $S_{vector}$ for use in the calculation of a normal N.

For example, a Bright pixel for use in the calculation of an S vector can be selected from the $95^{th}$ percentile among the pixels of a Type B token, and a Dark pixel selected from the $5^{th}$ percentile.

Each normal, 1-K, based upon either a user selection and/or calculated by the CPU 12, is associated with pixel positions P corresponding to the pixels used to calculate the respective normal, N. For each normal based upon a user-selected lit-dark pair, P includes the pixels of each n×n array of pixels of each selected lit and dark pixel block. For each of the normals based upon linear tokens, P includes the pixels of the respective linear token. For each of the normals based upon an X-junction, P includes the pixels of the Type C tokens defining a respective X-junction. For each of the normals based upon Type B tokens, P includes the pixels of the respective Type B token.

In step 1006, the CPU 12 operates to optimize each of the 1-K normals. Each of the 1-K normals is estimated utilizing relatively few of the pixels (for example, the pixel positions P) of the entire image. FIG. 7c is a flow chart for implementing a log-chromaticity normal optimization technique (step 1006), according to a feature of the present invention, to provide a more robust estimate of each normal relative to the entire set of pixels forming the image being processed. The CPU 12 executes the routine of FIG. 7c once for each of the 1-K normals selected by a user and/or calculated by the CPU 12, to optimize each one of the respective 1-K normals relative to all of the pixels of the image being processed.

In step 2000, one of the 1-K normals, is input to the CPU 12, (for example, as estimated by one of the example techniques (corresponding to steps 1002a-c) (shown next to step 2000, in FIG. 7c)), together with the pixel positions P used to calculate the respective normal.

In step 2002 the CPU 12 calculates a weight w for each pixel of the image being processed I, (an image file 18, also input to the CPU 12 (step 2002a)). The weight for each pixel of the image, in the exemplary embodiment of the present invention, is determined as a function of each of a spatial distance between the respective pixel and the set of pixels P used to calculate the respective normal and a spectral distance between the pixel and the set of pixels P.

In a general case for the exemplary embodiment of the present invention, the weight w at a particular pixel $p_i$, in the image I, relative to P, is computed based upon a set of M distance functions (M=1-k), $d_k=(p_i, P)$, between the pixel p, and P.

When the k value for M equals two, for example, the spatial distance and spectral distance functions of the exemplary embodiment, a $d_k(p_i, P)$ value for each pixel corresponds to one of a $d_{spatial}$ distance value and a $d_{spectral}$ distance value for that pixel. Each $d_k(p_i, P)$ value is calculated for each pixel $p_i$ of the image by the CPU 12. The spatial distance value measures a Euclidean norm in the spatial extent of the image, as shown, for example, in FIG. 2. The spectral distance measures a distance in a color space, such as, for example, the log color space shown in FIG. 5.

For the spatial distance: $d_{spatial}(p_i, P)=\min (p \in P)\|p_i-p\|_2$ wherein $\min (p \in P)$ is the closest pixel in P to the pixel $p_i$ in terms of a Euclidean distance, and $\|p_i-p\|_2$ denotes the Euclidean norm.

For the spectral distance: $d_{spectral}(p_i, P)=\min (p \in P)\|I(p_i)-I(p)\|_2$ wherein $\min (p \in P)$ is the closest pixel in P to the pixel $p_i$ in terms of spectral distance in a log-RGB space, $I(p_i)$ is the log-RGB value and $\|I(p_i)-I(p)\|_2$ is the norm of the spectral distance.

Upon the calculation of a spatial distance and spectral distance for each pixel, the CPU 12 operates to determine a weight for each pixel as a function of the calculated distances. Each of the spatial and spectral distances for each pixel is converted by the CPU 12 to a weight $w_{k,i} \in |0,1|$, for example, by implementing a soft threshold function, such as a sigmoid:

$$w_{k,i}(d_k(p_i,P))=1/1+\exp(-\beta_k(d_k(p_i,P)-\tau_k))$$

wherein $\beta_k$ and $\tau_k$ are parameters defining the softness and position of the threshold function, respectively. Thus, in the exemplary embodiment of the present invention, when M=2, for each pixel $p_i$, a weight is calculated based upon the spatial distance for the pixel: $w_{spatial}(d_{spatial}(p_i, P))$ and an additional weight is calculated based upon the spectral distance: $w_{spectral}(d_{spectral}(p_i, P))$.

In the exemplary embodiment of the present invention, the parameter values can be set, as follows:
$\beta_{spatial}=0.5$
$\tau_{spatial}=10$
$\beta_{spectral}=5$
$\tau_{spectral}=1$ A single weight $w_i$, for each particular pixel $p_i$ is calculated as a function of the corresponding spatial and spectral weights, as follows:

$$w_i=\Pi(k=1,M)w_{k,i}(d_k(p_i,P))$$

Figure 7D:
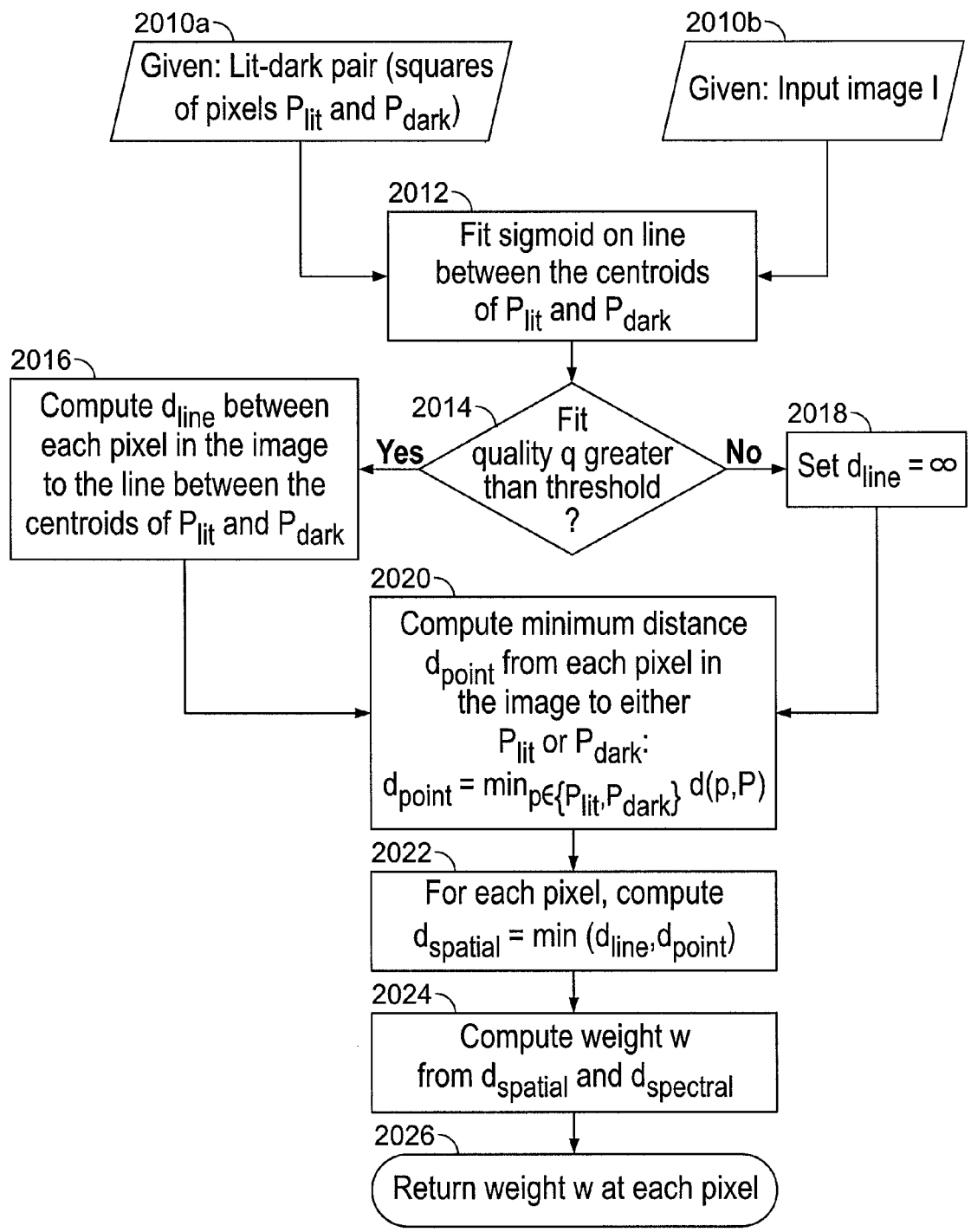

When M=2, $w_i=w_{spatial}(d_{spatial}(p_i, P))\times w_{spectral}(d_{spectral}(p_i, P))$ In the case of a normal calculated based upon user elected lit-dark pairs of pixel blocks, a different algorithm can be implemented to determine the spatial weight of each pixel. The concept of the weight algorithm used when the estimate for the normal is based upon user selected lit, dark pairs relates to the fact that a line extending between the centroid of the selected lit pixel block and the centroid of the selected dark pixel block provides more candidate pixels $P_l$ (the additional pixels forming the line) for the pixel positions P, resulting in a more robust estimate for the weight of the normal. FIG. 7d is a flow chart for implementing a log-chromaticity normal optimization technique when the normal is estimated based upon user selected lit-dark pairs of pixel blocks.

In steps 2010a, b, a set of lit, dark n×n pixel blocks, as selected by a user, and the image being processed, I are input to the CPU 12.

In step 2012, the CPU 12 operates to fit a sigmoid on a line l extending between the centroid ($p_{lit-centroid}$) of the lit n×n pixel block ($P_{lit}$) and the centroid ($p_{dark-centroid}$) of the dark n×n pixel block ($P_{dark}$). Ideally, a user selects lit/dark pairs that are lit and shadowed regions of a same material. However, a user can select pairs of pixel blocks that are at different materials within the image. An analysis based upon a sigmoid fit can be used to verify that the line is crossing a shadow boundary extending over a single material.

In an exemplary embodiment of the present invention, a parametric model of illumination is used to determine if the line l extending between the centroid of the lit pixel block and the centroid of the dark pixel block overlaps a shadow boundary extending across a single material. For example, the model for an illumination transition is a sigmoid σ: $\sigma(x)=\alpha/1+\exp(-\gamma(x-x_{cen}))+s$ wherein x is a point along the line l, α is a scale factor, γ is the slope of the sigmoid (rate of change in intensity with respect to the x position), $x_{cen}$ is the offset along l and s is an intensity offset.

Fitting the model to find the parameters (e.g. α and γ) that minimize the difference between the model and the observed image data, can be implemented via a non-linear optimization procedure such as, for example, the Levenberg-Marquardt algorithm. A fit quality q for the set of pixels $P_l$ forming the line 1 can be defined to be inversely proportional to the residual between the final fitted model and the original image data I. For example, the CPU 12 can use the root mean squared error measure:

$$q = -\sqrt{\frac{1}{|\mathcal{P}_l|} \sum_{k \in \mathcal{P}_l} \sum_{b \in \{R,G,B\}} (\sigma_b(k) - I_b(k))^2}$$

In the decision block 2014, the CPU 12 determines if the fit quality q calculated in step 2012, is greater than a threshold value, indicating that the line crosses a shadow boundary over a single material. If yes, the CPU 12 proceeds to step 2016 to compute a distance, $d_{line}$, to measure a spatial distance from each pixel $p_i$ in the image being processed I to the line l, as follows:
first, calculate the quantity δ:

$$\delta = (p_i - p_{lit\text{-}centroid}) \times (p_{dark\text{-}centroid} - p_{lit\text{-}centroid}) / \| p_{dark\text{-}centroid} - p_{lit\text{-}centroid} \|$$

when δ<0, then $d_{line}(p_i, P_l) = \|p_i - p_{lit\text{-}centroid}\|$
when 0≤δ≤1, then:

$$d_{line}(p_i, P_l) = |(p_{lit\text{-}centroid} - p_{dark\text{-}centroid}) \times (p_{dark\text{-}centroid} - p_i)| / |(p_{lit\text{-}centroid} - p_{dark\text{-}centroid})|$$

when δ≥1, then: $d_{line}(p_i, P_l) = \|p_i - p_{dark\text{-}centroid}\|$

If no, the CPU 12 sets $d_{line}(p_i, P_l) = \infty$, for each pixel of the image/(step 2018).

After the performance of either steps 2016 or 2018, the CPU 12 proceeds to step 2020. In step 2020, the CPU 12 calculates a distance $d_{point}(p_i, P)$, to measure the spatial distance between each pixel $p_i$ and P (the pixels of $P_{lit}$ and $P_{dark}$ without the pixels of the line l), as follows: $d_{point}(p_i, P) = \min$ (p ∈ $P_{lit}, P_{dark}$) $\|p_i - p\|_2$ (corresponding to the spatial distance calculated in the general case, as described above).

In step 2022, the CPU 12 computes the spatial distance, $d_{spatial}(p_i, P)$, for each pixel, as a function of $d_{line}(p_i, P_l)$ (calculated in steps 2016 or 2018) and $d_{point}(p_i, P)$ calculated in step 2020, as follows:

$$d_{spatial}(p_i, P) = \min(d_{line}(p_i, P_l), d_{point}(p_i, P)).$$

wherein min ($d_{line}(p_i, P_l)$, $d_{point}(p_i, P)$) is the minimum of the two distances.

In steps 2024 and 2026, the CPU 12 computes and outputs a weight for each pixel, according to the steps executed by the CPU 12 in the general case, described above, using the spatial distance, as calculated for the case of a user-selected normal, and the spectral distance, as calculated in the general case.

Referring once again to FIG. 7c, after the performance of step 2002, to compute a weight for each pixel, the CPU 12 proceeds to step 2004. In step 2004, the CPU 12 finds an optimized normal based upon a method to minimize a weighted entropy, using the weight calculation from step 2002. In step 2004a, a list of colors based upon Type C tokens, for example, as determined in step 202 of FIG. 6, is input to the CPU 12, for use in the weighted entropy minimization technique.

Figure 7E:
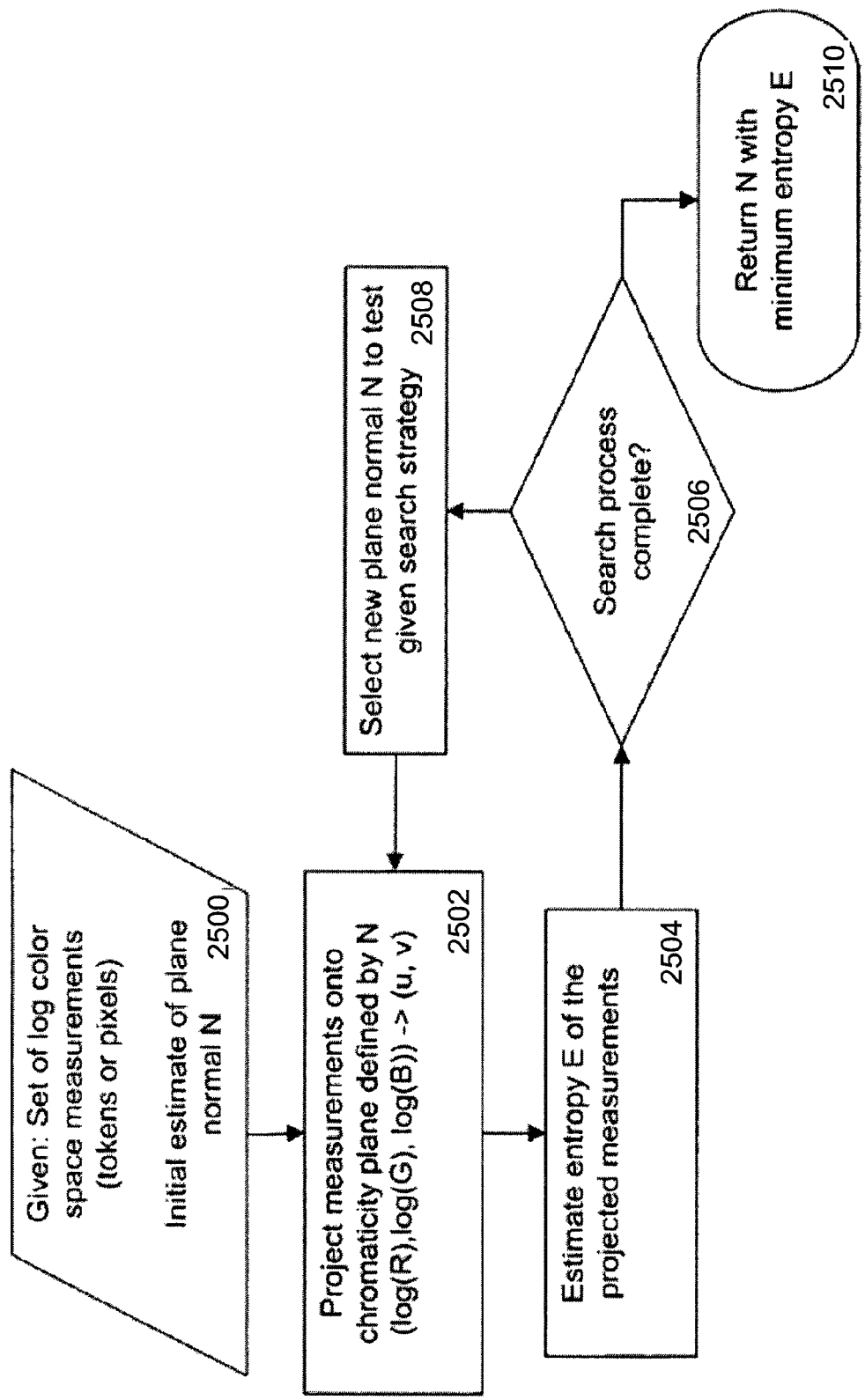

FIG. 7e is a flow chart illustrating an entropy minimization technique, according to a feature of the present invention. In step 2500, the list of colors (step 2004a of FIG. 7c) and an initial normal value (one of the 1–K estimates) are input to the CPU 12. In step 2502, the CPU 12 operates to project each color from the list of colors to a chromaticity plane defined by the normal N. The projection step is executed as per the routine of FIG. 8, as described in detail below.

In step 2504, the CPU 12 operates to estimate the entropy of the projected colors. Entropy is inversely proportional to order, the lower the entropy, the higher the order of the system under review. At an optimal orientation for the chromaticity plane, all bright and dark pixel pairs for a single material depicted in an image file 18, should project to the same point on the chromaticity plane, a high order, or low entropy state. The entropy of the projection of points onto the plane is a measure of how well the pairs line up for all materials in an image file 18, for example, the image file 18 for the image being processed I. The lower the entropy, the higher the order of the chromaticity plane, and, thus, the more accurate the projections of bright/dark pairs.

U.S. Pat. No. 7,596,266, teaches a method for finding an optimal alignment for the normal N for the chromaticity plane, by utilizing an entropy minimization technique. As described in detail in U.S. Pat. No. 7,596,266, at each orientation selected for the chromaticity plane, a histogram for the chromaticity plane shows the distribution of log color space projections among a grid of bins. The wider the distribution across the plane of the histogram, the higher the entropy.

According to a feature of the present invention, the entropy equation based upon the bins of a histogram (H) is computed as a function of the weight calculations performed in step 2002 of FIG. 7c, as follows:

$$H = \Sigma_b w_b p_b \log p_b / \Sigma_b w_b,$$

wherein $p_b$ is the value of each bin of the histogram, calculated to provide an indication of the percentage of the distribution of log RGB values across the chromaticity plane in the bin, and $w_b$ is the sum of the weights of the pixels located in a bin (one $w_b$ sum value for each bin).

In step 2506, the CPU 12 executes a search strategy for candidate values for the normal, after the entropy calculation based upon the initial normal estimate (one of the 1–K normal estimates). The CPU 12 can execute any known search technique to select a series of orientations for the chromaticity plane, relative to the initial value, and thereafter, select the orientation for the plane having the lowest entropy. Such known search techniques include, for example, exhaustive search, univariate search, and simulated annealing search methods described in the literature. For example, the univariate search technique is described in Hooke & Jeeves, "Direct Search Solution of Numerical and Statistical Problems," Journal of the ACM, Vol. 8, pp 212-229, April, 1961. A paper describing simulated annealing is Kirkpatrick, Gelatt, and Vecchi, "Optimization by Simulated Annealing," Science 220 (1983) 671-680. Various other search techniques are described in Reeves, ed., Modern Heuristic Techniques for Combinatorial Problems, Wiley (1993).

Step 2506 is implemented as a decision block. The search technique is operated to identify a fixed number of candidate normals. If the search process is not yet complete, the CPU 12 outputs a newly selected normal value, identified via the search process (step 2508). The CPU 12 then proceeds to repeat steps 2502 and 2504, using the new candidate normal, to calculate an entropy measure for the image.

In the event that the search process is complete, the CPU 12 operates to select and output the normal corresponding to the bin color distribution having the lowest entropy (showing the highest order for the chromaticity plane, and, thus, the most accurate projection of image colors).

Returning once again to FIG. 7c, the output of the normal value corresponding to the lowest entropy completes step 2004. In step 2006, the CPU 12 outputs the optimized value for the one of the 1-K estimated normals input to the routine of FIG. 7c. As noted above, the CPU 12 executes the routine of FIG. 7c (step 1006 of FIG. 7b) once for each of the 1-K normals selected by a user and/or calculated by the CPU 12, to optimize each one of the respective 1-K normals relative to all of the pixels of the image being processed.

Upon completion of step 1006, the CPU 12 proceeds to step 1008. As shown in FIG. 7b, step 1008 includes sub-steps 1008a-c. In each sub-step 1008a-c, the CPU 12 operates to generate a normal image or map for one or more of the optimized values for the 1-K normals. In each normal map, for each pixel (or Type C token (input in step 1004)) of the image I, the CPU 12 designates a normal value, for use in a projection to the chromaticity plane. The number of sub-steps can be 1-M, wherein M is a variable. For example, M can be set to equal K such that there is a single normal map for each one of the optimized 1-K normals. In the alternative, there can be multiple normal maps, each based upon some or all of the 1-K normals.

In the simplest case, the CPU 12 assigns the same optimized one of the 1-K normals for each pixel or Type C token in the respective map, with one map for each one of 1-K normals. The optimized one of the 1-K normals can also be an average of all of the K normals to provide a single normal map, with the average value for the normal assigned to each pixel in the image. In other cases, additional maps can be generated for the 1-K normals, including spatially varying normal values to accommodate varying conditions that can exist throughout an image (see the examples illustrated next to step 1008c in FIG. 7b).

For example, a normal map can contain a normal for each image location, each normal being based upon all or some of the 1-K normal estimates, such as the k nearest neighboring normals to an image location (pixel or Type C token) (k-NN), where k is a number set at a value equal to all or a sub-set of the number of 1-K normals, and/or each normal being calculated using a linear system of equations based upon constraints placed upon relationships among the 1-K normals.

In a k-NN algorithm, the CPU 12 computes for each image location (pixel or Type C token), the distance between that location and each of the k nearest normals to the respective location. The value for k is set to a number equal to all or any sub-set of the 1-K number of optimized normal estimates found in step 1006 of FIG. 7b. The CPU 12 then converts the calculated distances into corresponding weights for use in computing a normal for each image location, as a function of the k nearest normal estimates.

In an exemplary embodiment of the present invention, the distance function for each image location (for example, each pixel $p_i$) to each one of the k nearest normals to that location, is a weighted linear combination of M individual distance functions, as follows:

$$d(p_i,P_x)=\Sigma(\text{from } l=1 \text{ to } M)d_l(p_i,P_x)$$

wherein, similar to the optimization method of the routine of FIG. 7c, M is set to 2, and $d_l(p_i, P_x)$ is the distance between a particular pixel $p_i$ and one of the k nearest normals, $P_x$ are the pixels used to estimate the one of the k nearest normals, and each $d_l(p_i, P_x)$ includes a spatial distance, $d_{spatial}(p_i, P_x)$ and a spectral distance, $d_{spectral}(p_i, P_x)$, each calculated as in the optimization method.

Moreover, in the case of M=2, the weighted distance function for each pixel $p_i$ is expressed, as follows:

$$d(p_i,P_x)=\lambda_1 d_{spatial}(p_i,P_x)+\lambda_2 d_{spectral}(p_i,P_x)$$

wherein $\lambda_1$ and $\lambda_2$ are parameters set to control the relative importance between the spatial and spectral distances in the weighted distance calculation.

In the example of finding a normal based upon a k-NN algorithm when the image locations are pixels p, upon calculating a weighted distance d $(p_i, P)$ for each pixel $p_i$, the CPU 12 can proceed to a computation of a normal $n_i$ for each pixel location, as follows:

$$n_i=\Sigma(\text{from } x=1 \text{ to } k)w_x n_x$$

wherein $n_x$ is one of the k nearest normals, and the weight for the pixel relative to the one normal, $w_x=1-d\ (p_i, P_x)/\max_{x=1\ldots k} d\ (p_i, P_x)+\epsilon$ wherein d $(p_i, P_x)$ is the weighted distance to the current one of the k nearest normals in the summation, $\max_{x=1\ldots k} d\ (p_i, P_x)$ is the distance to the furthest one of the k normals and $\epsilon$ is a small weight added to the distance to the furthest one of the normals to keep $w_x$ non-zero, for example, $\epsilon=0.01$.

A normal map can then be output by the CPU 12 with an $n_i$ normal value determined as a function of the k-NN algorithm, for each pixel location in the image I.

Figure 7F:
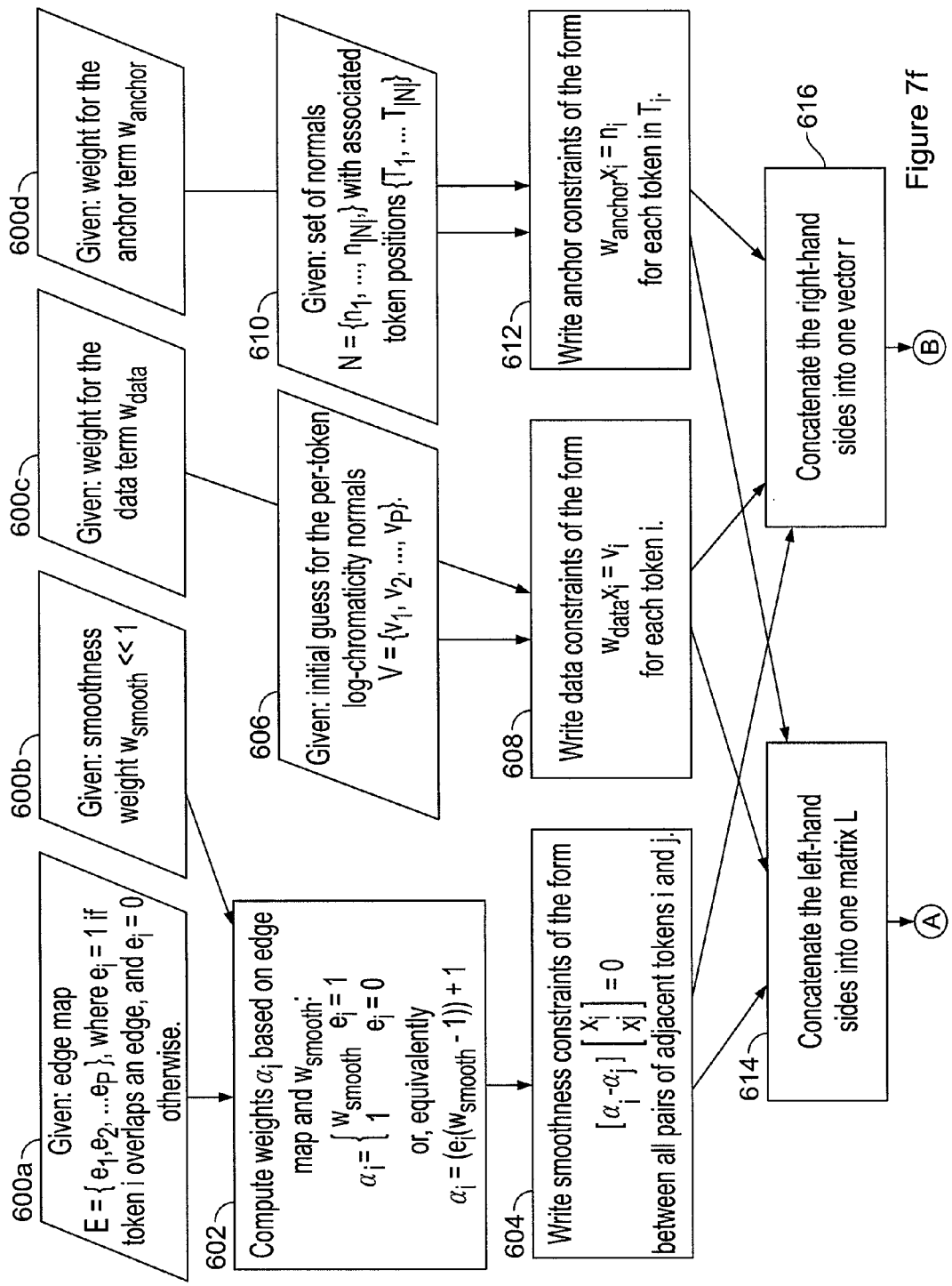
Figure 7F:
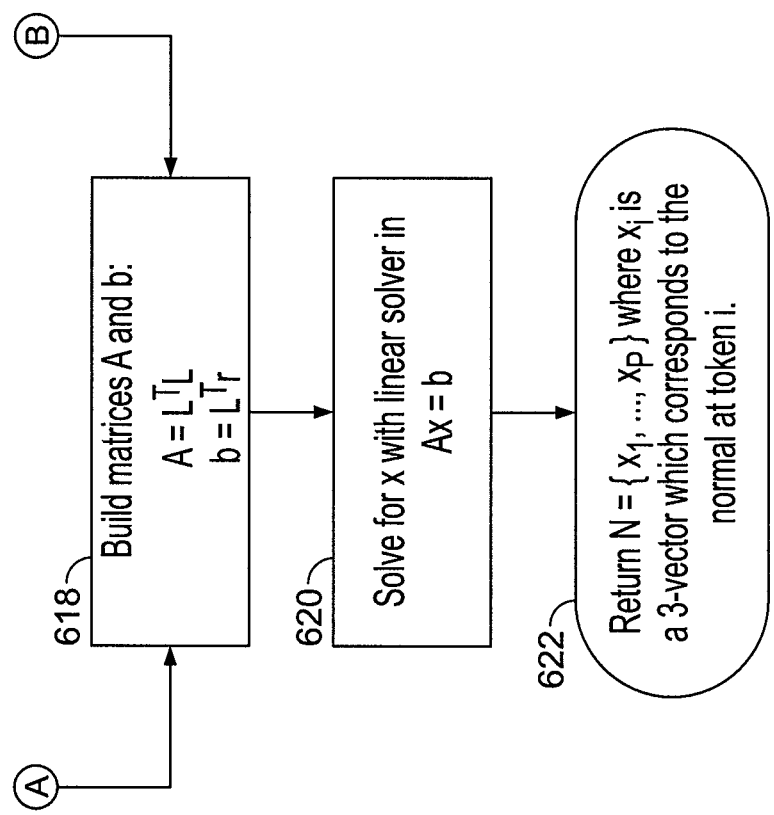

In a further exemplary embodiment of the present invention, the CPU 12 executes one or more of sub-steps 1008a-c of FIG. 7b by building a system of linear equations based upon a series of constraints between, for example, $n_i$ normal values for image locations determined as a function of the k-NN algorithm, to generate a normal map. FIG. 7f is a flow chart showing the use of a system of linear equations to estimate spatially varying normals for each token t in the image I.

In steps 600a-d, information and parameters relevant to the linear equations are input to the CPU 12. For example, in step 600a, a set of values E represents an edge value $e_i$, one value for each token in the image, where $e_i=1$ if the corresponding token of the image overlaps a material edge, and $e_i=0$ if otherwise. In step 600b a smoothness weight $w_{smooth} \ll 1$ is input to the CPU 12.

In an exemplary embodiment of the present invention, the set of weights E is determined based upon an edge detection. For example, normals determined using the k-NN algorithm can be used to generate a log-chromaticity representation for the image, for example, by operating the CPU 12 to execute the routine of FIG. 8. The resulting representation will be an illumination invariant version of the original image. A Canny edge detection algorithm can then be used to identify pixels forming an edge in the representation. Each edge pixel is assigned a 1 value. Then each token for the image I being processed (step 1004 of FIG. 7b) including a majority of constituent pixels with a 1 value is assigned an $e_i=1$, and all other tokens are assigned an $e_i=0$.

Each of the set of values E and the weight $w_{smooth}$ are used to define a set of weight values for use in smoothness constraints (step 602) such that a weight $\alpha_i$ for a corresponding token is set to $w_{smooth}$ when the $e_i$ for the token is 1, and set to 1 when the $e_i$ is 0. The smoothness constraint takes the form shown in step 604, as follows:

$$[a_i \quad -a_j]\begin{bmatrix}x_i\\x_j\end{bmatrix}=0$$

wherein $x_i$ and $x_j$ are normals to be determined for two adjacent tokens, the constraint encourages the two normals to be the same when neither one of the adjacent tokens is an edge token.

In step 600c, a data weight value, $w_{data}$, is input to the CPU 12. The weight is used in a data constraint that encourages a normal for an image location to stay close to an estimate for the normal value determined in a previously executed method, for example, the k-NN method. Then weight sets the relative importance of the data constraint. In step 606, a set of normal estimates $V=\{v_1, v_2 \ldots v_p\}$, is input to the CPU 12, wherein each v, is, for example, a k-NN estimate for a normal for an image token t. The constraint takes the form as shown in step 608: $w_{data}x_i=v_i$, wherein $x_i$ is the normal to be determined for the corresponding token t.

In step 600d, a weight $w_{anchor}$, for an anchor constraint, is input to the CPU 12. The anchor constraint focuses on tokens that include pixels used to estimate the 1–K normals. To that end, in step 610, an input to the CPU 12 includes the set of 1–K normals N, including all of the normals estimated by a user selection and/or calculated by the CPU 12, and the associated token positions $\{T_1 \ldots T_N\}$, each token position including constituent pixels P corresponding to the pixels used to calculate a respective one of the 1–K normals, as described above. The anchor constraint encourages tokens used to estimate a normal to stay at that normal value. The constraint takes the form as shown in step 612: $w_{anchor}x_i=n_i$ wherein the weight $w_{anchor}$ sets the relative importance of the anchor constraint, $x_i$ is the normal to be determined for the corresponding token, and $n_i$ is the one of the 1–K normals estimates associated with the token.

In steps 614 and 616, the CPU 12 concatenates the left-hand and right-hand sides of the constraint equations of steps 604, 608 and 612, respectively, in an [L][x]=[r] matrix equation. In step 614, the [L] matrix includes a concatenation of each left-hand side of each of the smoothness, data and anchor constraints, with each instance of each constraint forming a row across the matrix. In step 616, the [r] matrix includes a concatenation of each right hand side of each of the smoothness, data and anchor constraints, with each instance of each constraint forming a row across the matrix.

In step 618, the an [A][x]=[b] matrix is built by the CPU 12 according to the following relationships: $[A]=[L^T][L]$ and $[b]=[L^T][r]$, wherein $[L^T]$ is the transpose of [L] and [x] is a set of normals $N=\{x_i \ldots x_n\}$ to be determined by a solution to the matrix equation.

In step 620, the CPU 12 solves for [x], a matrix of optimized normals, one for each image location, for example, Type C tokens, wherein each normal is a vector, for example a 3-vector in the RGB color space of the exemplary embodiment of the present invention. The solution can be implemented as a known least-squares algorithm.

In step 622, the CPU 12 outputs the set of normals $N=\{x_i \ldots x_n\}$.

Figure 7G:
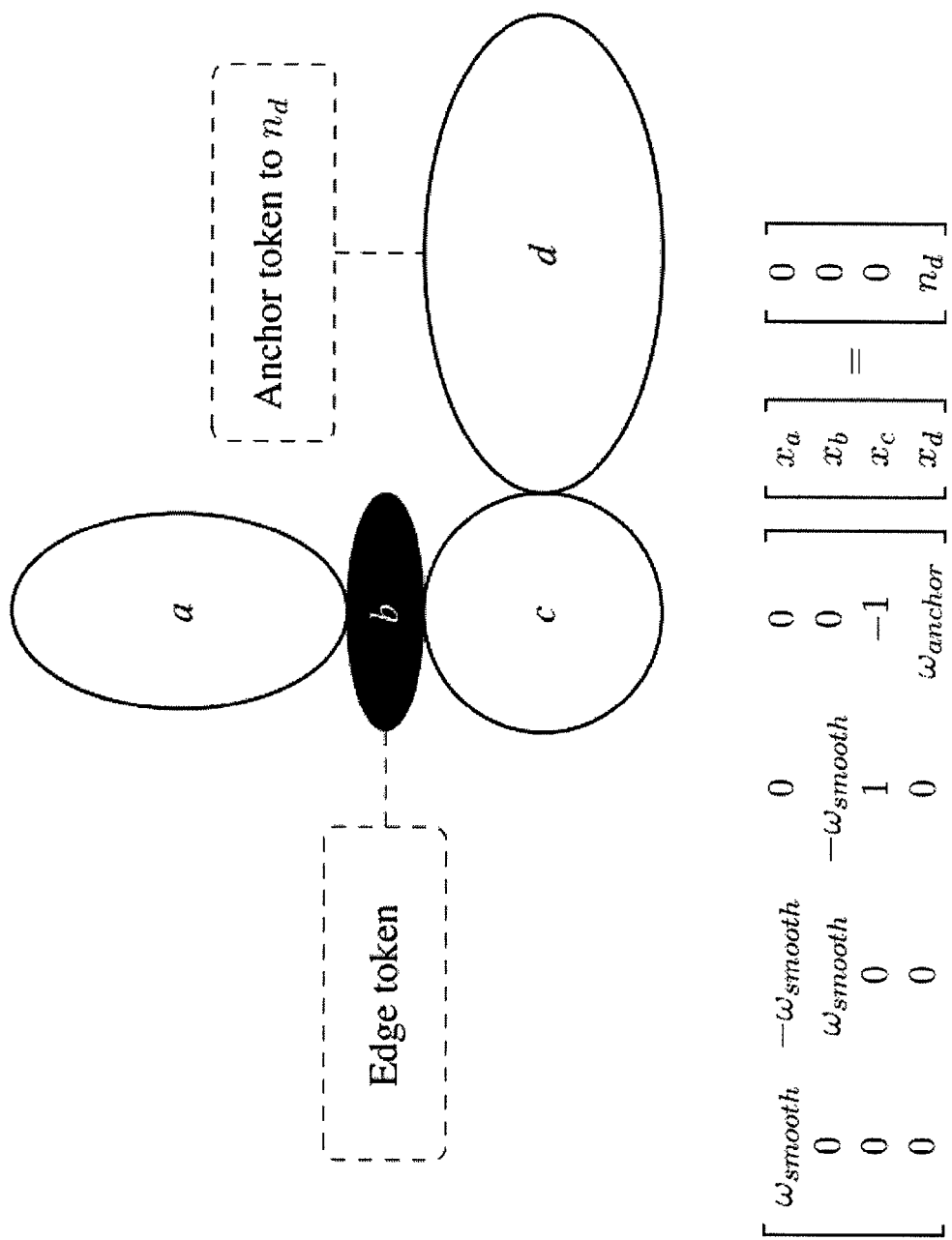

FIG. 7g shows an example of a token map having four tokens analyzed in the system of linear equations of FIG. 7f. In the example, four tokens a, b, c and d include one token (b) identified as an edge token, and one token (d) identified as a token used to estimate a normal $n_b$. The matrix shown in FIG. 7g represents an application of smoothness constraints to the set of tokens a, b, c and d and an anchor constraint to the token d. The CPU 12 can solve the matrix equation to provide a set of normals, $x_a, x_b, x_c,$ and $x_d$, one for each of the tokens a, b, c and d, respectively.

Upon completion of steps 1008a-c of FIG. 7b, the CPU 12 proceeds to sub-steps 1010a-c. In each sub-step 1010a-c, the CPU executes the routines of FIGS. 8-11, to generate a log-chromaticity clustering map corresponding to a respective one of the M normal maps. Each clustering map provides a same reflectance map since the pixels or Type C tokens (step 1004) included in each identified cluster relate to a single material reflectance, independent of illumination. Each cluster map includes a list of cluster group memberships cross-referenced to the pixels or Type C tokens of the image being processed I.

FIG. 8 is a flow chart for determining log-chromaticity coordinates for the colors of an input image, as identified in steps 202 or 204 of the routine of FIG. 6. In step 220, a list of colors is input to the CPU 12. The list of colors can comprise either the list generated through execution of step 202 of the routine of FIG. 6, or the list generated through execution of step 204. In step 222, one of the maps for one of the optimized 1-K log-chromaticity orientations for the normal, N, determined through execution of the routine of FIG. 7b, is also input to the CPU 12.

In step 224, the CPU 12 operates to calculate a log value for each color in the list of colors and plots the log values in a three dimensional log space at respective (log R, log G, log B) coordinates, as illustrated in FIG. 5. Materials A, B and C denote log values for specific colors from the list of colors input to the CPU 12 in step 220. A log-chromaticity plane is also calculated by the CPU 12, in the three dimensional log space, with u, v coordinates and an orientation set by N, input to the CPU 12 in step 222. The orientation N used for each particular color is set to correspond to the normal indicated for the corresponding pixel or Type C token in the respective normal map. Each u, v coordinate in the log-chromaticity plane can also be designated by a corresponding (log R, log G, log B) coordinate in the three dimensional log space.

According to a feature of the related invention, the CPU 12 then projects the log values for the colors A, B and C onto the log-chromaticity plane (oriented, in each case, according to the normal N listed in the normal map for the pixel (or Type C token) corresponding to the color) to determine a u, v log-chromaticity coordinate for each color. Each u, v log-chromaticity coordinate can be expressed by the corresponding (log R, log G, log B) coordinate in the three dimensional log space. The CPU 12 outputs a list of the log-chromaticity coordinates in step 226. The list cross-references each color to a u, v log-chromaticity coordinate and to the pixels (or a Type C token) having the respective color (depending upon the list of colors used in the analysis (either step 202 (tokens) or 204 (pixels))).

FIG. 9 is a flow chart for optionally augmenting the log-chromaticity coordinates for pixels or Type C tokens with extra dimensions, according to a feature of the related invention. In step 230, the list of log-chromaticity coordinates, determined for the colors of the input image through execution of the routine of FIG. 8, is input to the CPU 12. In step 232, the CPU 12 accesses the input image file 18, for use in the augmentation.

In step 234, the CPU 12 optionally operates to augment each log-chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log-chromaticity coordinates and similar tone mapping intensities. This improves the accuracy of a clustering step.

In step 236, the CPU 12 optionally operates to augment each log-chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 234 and 236, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T^*w_1$, $x^*w_2$ $y^*w_3$) where T, x and y are the tone mapped intensity, the x coordinate and the y coordinate, respectively.

In step 238, the CPU 12 outputs a list of the augmented coordinates. The augmented log-chromaticity coordinates provide accurate illumination invariant representations of the pixels, or for a specified regional arrangement of an input image, such as, for example, Type C tokens. According to a feature of the related invention and the present invention, the illumination invariant characteristic of the log-chromaticity coordinates is relied upon as a basis to identify regions of an image of a single material or reflectance, such as, for example, Type B tokens.

FIG. 10 is a flow chart for clustering the log-chromaticity coordinates, according to a feature of the present invention. In step 240, the list of augmented log-chromaticity coordinates is input the CPU 12. In step 242, the CPU 12 operates to cluster the log-chromaticity coordinates. According to the teachings of the related invention, the clustering step can be implemented via, for example, a known k-means clustering. Any known clustering technique can be used to cluster the log-chromaticity coordinates to determine groups of similar log-chromaticity coordinate values, according to the related invention. According to the teachings of each of the related invention and the present invention, the CPU 12 correlates each log-chromaticity coordinate to the group to which the respective coordinate belongs.

According to a feature of the present invention, the clustering step 242 is implemented as a function of an index of the type used in database management, for example, a hash index, a spatial hash index, b-trees or any other known index commonly used in a database management system. By implementing the clustering step 242 as a function of an index, the number of comparisons required to identify a cluster group for each pixel or token of an image is minimized. Accordingly, the clustering step can be executed by the CPU 12 in a minimum amount of time, to expedite the entire image process.

Figure 10A:
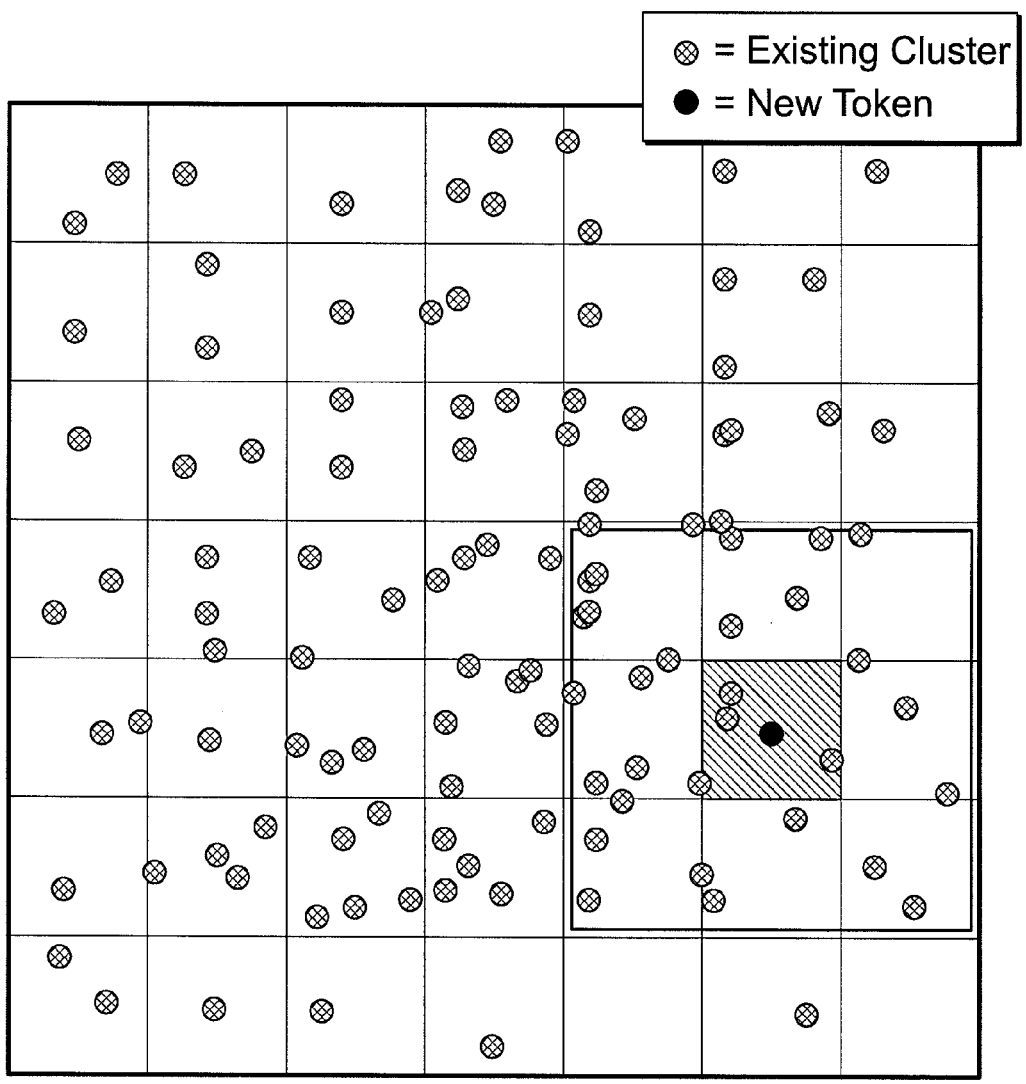
FIG. 10a is an illustration of a grid for a spatial hash, according to a feature of the present invention.

FIG. 10a is an illustration of a grid for a spatial hash, according to a feature of an exemplary embodiment of the present invention. As shown in FIG. 10a, a spatial hash divides an image being processed into a grid of buckets, each bucket being dimensioned to be spatialThresh×spatialThresh. The grid represents a histogram of the u, v log-chromaticity values for the cluster groups. As each cluster is created, a reference to the cluster is placed in the appropriate bucket of the grid.

Each new pixel or token of the image being processed is placed in the grid, in the bucket it would occupy, as if the item (pixel or token) was a new group in the clustering process. The pixel or token is then examined relative to the clusters in, for example, a 3×3 grid of buckets surrounding the bucket occupied by the item being examined. The item is added to the cluster group within the 3×3 gird, for example, if the item is within a threshold for a clusterMean.

The CPU 12 also operates to calculate a center for each group identified in the clustering step. For example, the CPU 12 can determine a center for each group relative to a (log R, log G, log B, log T) space.

In step 244, the CPU 12 outputs a list of the cluster group memberships for the log-chromaticity coordinates (cross referenced to either the corresponding pixels or Type C tokens) and/or a list of cluster group centers.

Pursuant to a further feature of the present invention, the list of cluster group memberships can be augmented with a user input of image characteristics. For example, a user can specify pixels or regions of the image that are of the same material reflectance. The CPU 12 operates to overlay the user specified pixels or regions of same reflectance onto the clustering group membership information.

As noted above, in the execution of the clustering method, the CPU 12 can use the list of colors from either the list generated through execution of step 202 of the routine of FIG. 6, or the list generated through execution of step 204. In applying the identified cluster groups to an input image, the CPU 12 can be operated to use the same set of colors as used in the clustering method (one of the list of colors corresponding to step 202 or to the list of colors corresponding to step 204), or apply a different set of colors (the other of the list of colors corresponding to step 202 or the list of colors corresponding to step 204). If a different set of colors is used, the CPU 12 proceeds to execute the routine of FIG. 11.

FIG. 11 is a flow chart for assigning the log-chromaticity coordinates to clusters determined through execution of the routine of FIG. 10, when a different list of colors is used after the identification of the cluster groups, according to a feature of the present invention. In step 250, the CPU 12 once again executes the routine of FIG. 8, this time in respect to the new list of colors. For example, if the list of colors generated in step 202 (colors based upon Type C tokens) was used to identify the cluster groups, and the CPU 12 then operates to classify log-chromaticity coordinates relative to cluster groups based upon the list of colors generated in step 204 (colors based upon pixels), step 250 of the routine of FIG. 11 is executed to determine the log-chromaticity coordinates for the colors of the pixels in the input image file 18.

In step 252, the list of cluster centers is input to the CPU 12. In step 254, the CPU 12 operates to classify each of the log-chromaticity coordinates identified in step 250, according to the nearest cluster group center. In step 256, the CPU 12 outputs a list of the cluster group memberships for the log-chromaticity coordinates based upon the new list of colors, with a cross reference to either corresponding pixels or Type C tokens, depending upon the list of colors used in step 250 (the list of colors generated in step 202 or the list of colors generated in step 204).

Upon completion of sub-steps 1010a-c, the CPU 12 outputs a set of log-chromaticity clustering maps, each including a list of cluster group memberships (from either steps 244 or 256 of the routines of FIGS. 8-11) for the pixels or Type C tokens of the image, and each one of the log-chromaticity clustering maps corresponding to one of the normal maps generated in sub-steps 1008a-c. In step 1012, the CPU 12 operates to merge the cluster group membership lists obtained from the multiple executions of the routines of FIGS. 8-11 in sub-steps 1010a-c, into a single composite cluster group membership list.

Figure 7H:
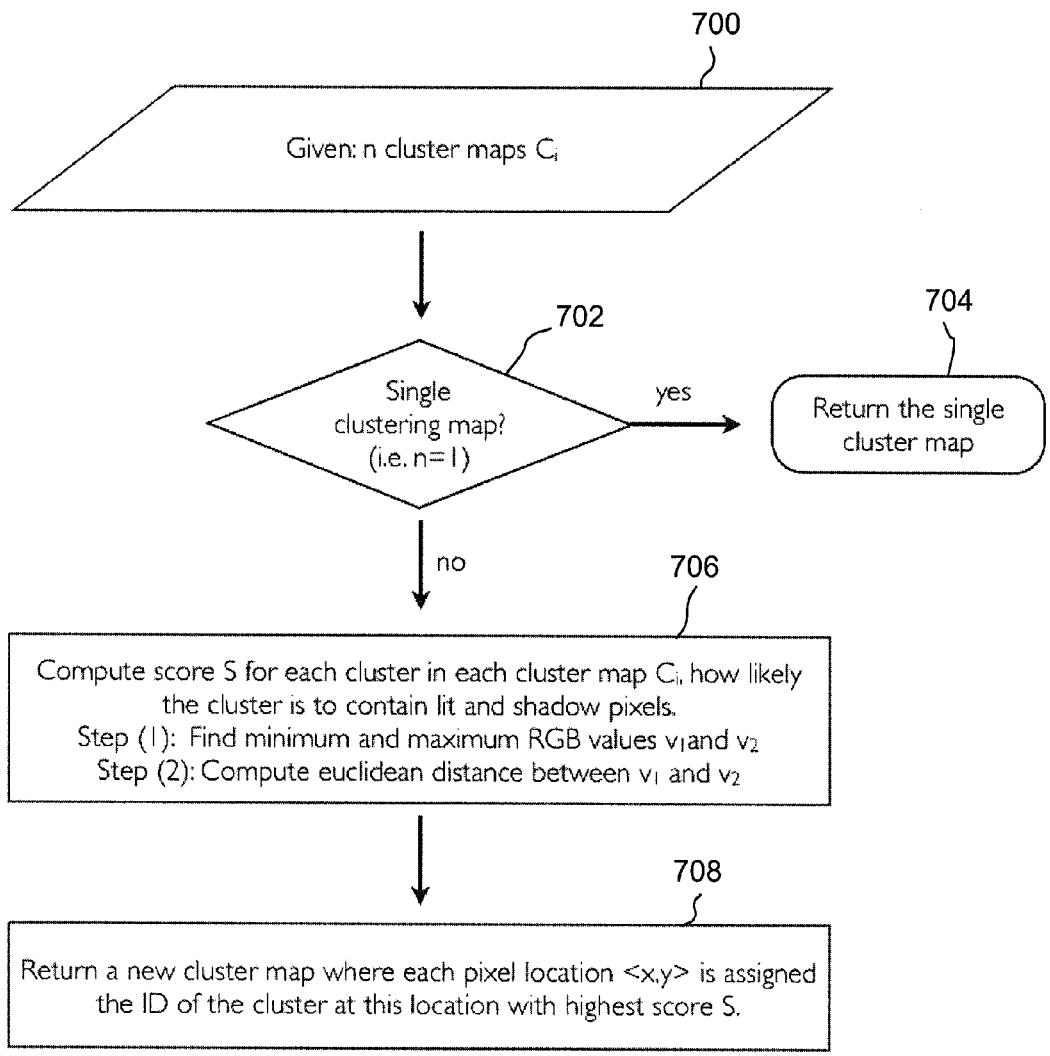

FIG. 7h is a flow chart for a multi-clustering merge step to provide a routine to implement step 1012 of FIG. 7b. In step 700, the set of log-chromaticity clustering maps generated in steps 1010a-c of FIG. 7b is input to the CPU 12. In a decision block (step 702) the CPU 12 determines if the input set of log-chromaticity clustering maps includes more than one map. In the simplest case, when K equals one optimized normal, there can be a case when only one cluster map is generated. In that case, the CPU 12 returns the single log-chromaticity clustering map as an output (step 704).

In the event the set of log-chromaticity clustering maps includes more than one map, the CPU 12 proceeds to step 706. In step 706, the CPU 12 operates to compute a score S for each cluster of each cluster map. The score is a measure of how likely a particular cluster includes lit and shadowed pixels of a single material reflectance. In an exemplary embodiment of the present invention, the score is obtained in a two step method applied to each cluster of each cluster map.

In a first step, the CPU 12 identifies the minimum and maximum RGB values, $v_1$ and $v_2$ among the pixels (or among the average color values for Type C tokens) of a particular cluster. In the second step, the CPU 12 computes the Euclidean distance between $v_1$ and $v_2$ as the score for the respective cluster.

In step 708, the CPU 12 generates a single cluster map by examining the cluster membership for each <x, y> location in the image plane (see, for example, FIG. 2) (i.e. the cluster group wherein the u, v coordinates of the chromaticity plane corresponding to the <x, y> location, has been placed), as indicated in each one of the set of log-chromaticity clustering maps, to select the one membership cluster for the respective <x, y> location, from among the entire set of log-chromaticity clustering maps, having the highest score. The single resulting cluster map therefor includes, as a cluster membership for each <x, y> location, the cluster for that location with the highest score, indicating the cluster for the location having the highest likelihood of including lit and shadowed pixels of a single material reflectance, and thus, providing the most accurate log-chromaticity representation for each respective pixel.

Referring once again to FIG. 7b, in step 1014, the CPU 12 outputs the single cluster map.

FIG. 12 is a flow chart for detecting regions of uniform reflectance based on the log-chromaticity clustering according to a feature of the present invention. In step 260, the input image file 18 is once again provided to the CPU 12. In step 262, one of the pixels or Type C tokens, depending upon the list of colors used in step 250, is input to the CPU 12. In step 264, the cluster membership information contained in the single composite cluster map, obtained from the merge performed in FIG. 7h, is input to the CPU 12.

In step 266, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the input image file 18. In step 268, the CPU 12 outputs a list of all regions of uniform reflectance (and also of similar tone mapping intensities and x, y coordinates, if the log-chromaticity coordinates were augmented in steps 234 and/or 236). It should be noted that each region of uniform reflectance (Type B token) determined according to the features of the present invention, potentially has significant illumination variation across the region.

U.S. Pat. No. 8,139,867 teaches a constraint/solver model for segregating illumination and material in an image, including an optimized solution based upon a same material constraint. A same material constraint, as taught in U.S. Pat. No. 8,139,867, utilizes Type C tokens and Type B tokens, as can be determined according to the teachings of the present invention. The constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Figure 13A:
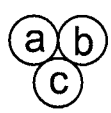
FIG. 13a is a representation of an [A][x]=[b] matrix relationship used to identify and separate illumination and material aspects of an image, according to a same-material constraint, for generation of intrinsic images.
Figure 13:
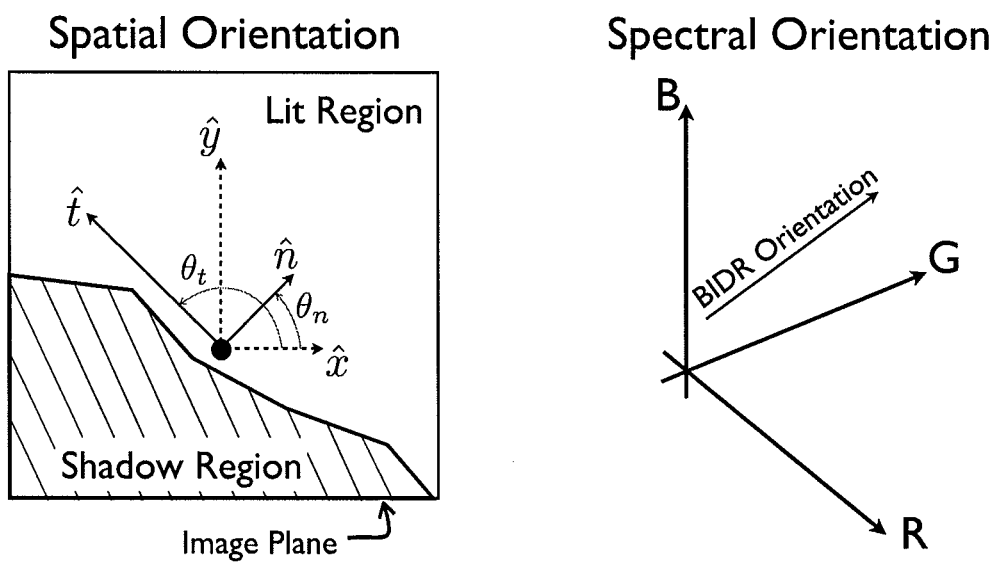
FIG. 13b shows graphical representations of each of a spatial orientation and a spectral orientation for an image location.
FIG. 13c is a flow cart for the creation of oriented, spatio-spectral illumination constraints, according to a feature of the present invention.
FIG. 13d illustrates a model that fits image data for each of red, green and blue bands of normal derivatives according to a feature of the present invention.
FIG. 13e includes (i) showing an example of normal and tangential constraints written with respect to three Type C tokens, a, b and c, (ii) showing a basic constraint matrix equation for the example, (iii) showing an illustration of a detailed oriented, spatio-spectral constraint equation, corresponding to the basic constraint matrix equation and (iv) showing a simple, un-oriented, same illumination constraint matrix equation based upon the example.
Figure 13:
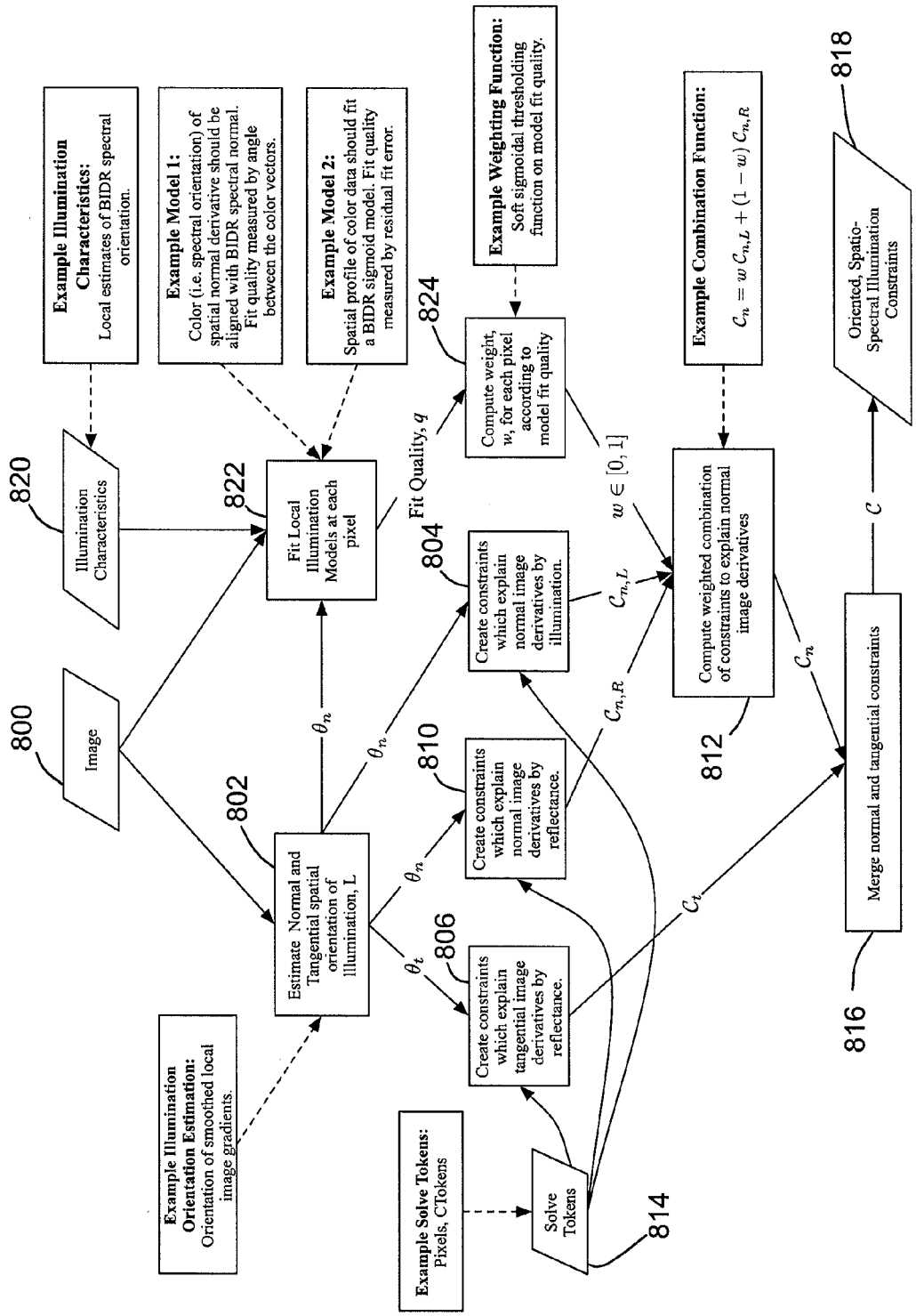
Figure 13:
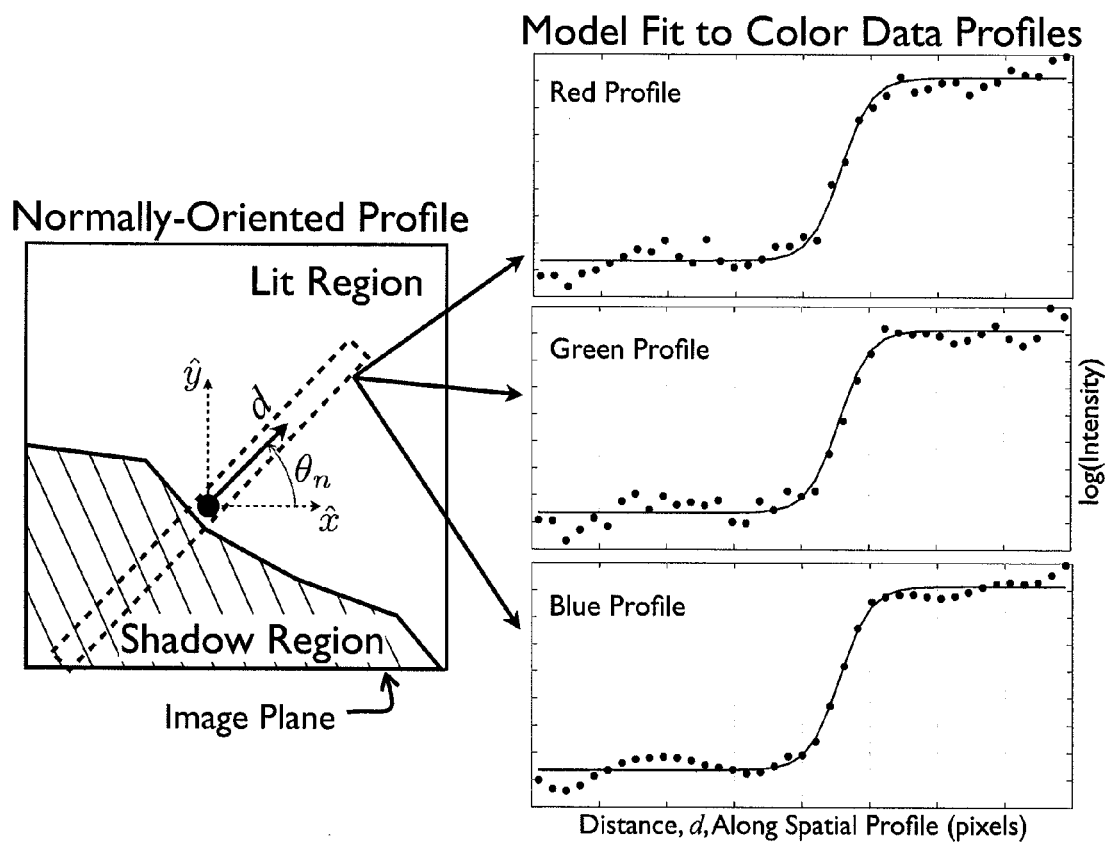
Figure 13:
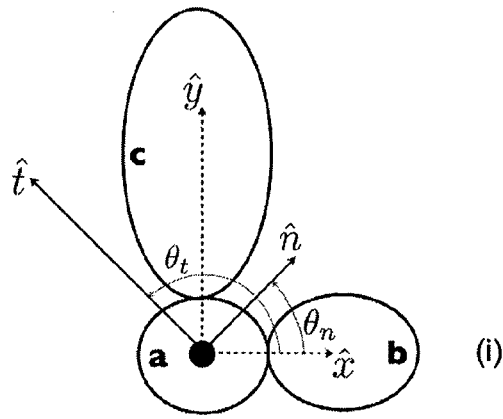

FIG. 13a is a representation of an [A][x]=[b] matrix relationship used to identify and separate illumination and material aspects of an image, according to a same-material constraint, as taught in U.S. Pat. No. 8,139,867. Based upon the basic equation I=ML (I=the recorded image value, as stored in an image file 18, M=material reflectance, and L=illumination), $\log(I)=\log(ML)=\log(M)+\log(L)$. This can be restated as $i=m+l$, wherein i represents $\log(I)$, m represents $\log(M)$ and l represents $\log(L)$. In the constraining relationship of a same material, in an example where three Type C tokens, a, b and c, (as shown in FIG. 13) are within a region of single reflectance, as defined by a corresponding Type B token defined by a, b and c, then $m_a=m_b=m_c$. For the purpose of this example, the I value for each Type C token is the average color value for the recorded color values of the constituent pixels of the token. The a, b and c, Type C tokens of the example can correspond to the blue Type B token illustrated in FIG. 3d.

Since: $m_a=i_a-l_a$, $m_b=i_b-l_b$, and $m_a=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 13, the various values for the log(I) ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation, by the CPU 12. It should be noted that each value is either a vector of three values corresponding to the color bands (such as red, green, and blue) of our example or can be a single value, such as in a grayscale image.

Figure 14:
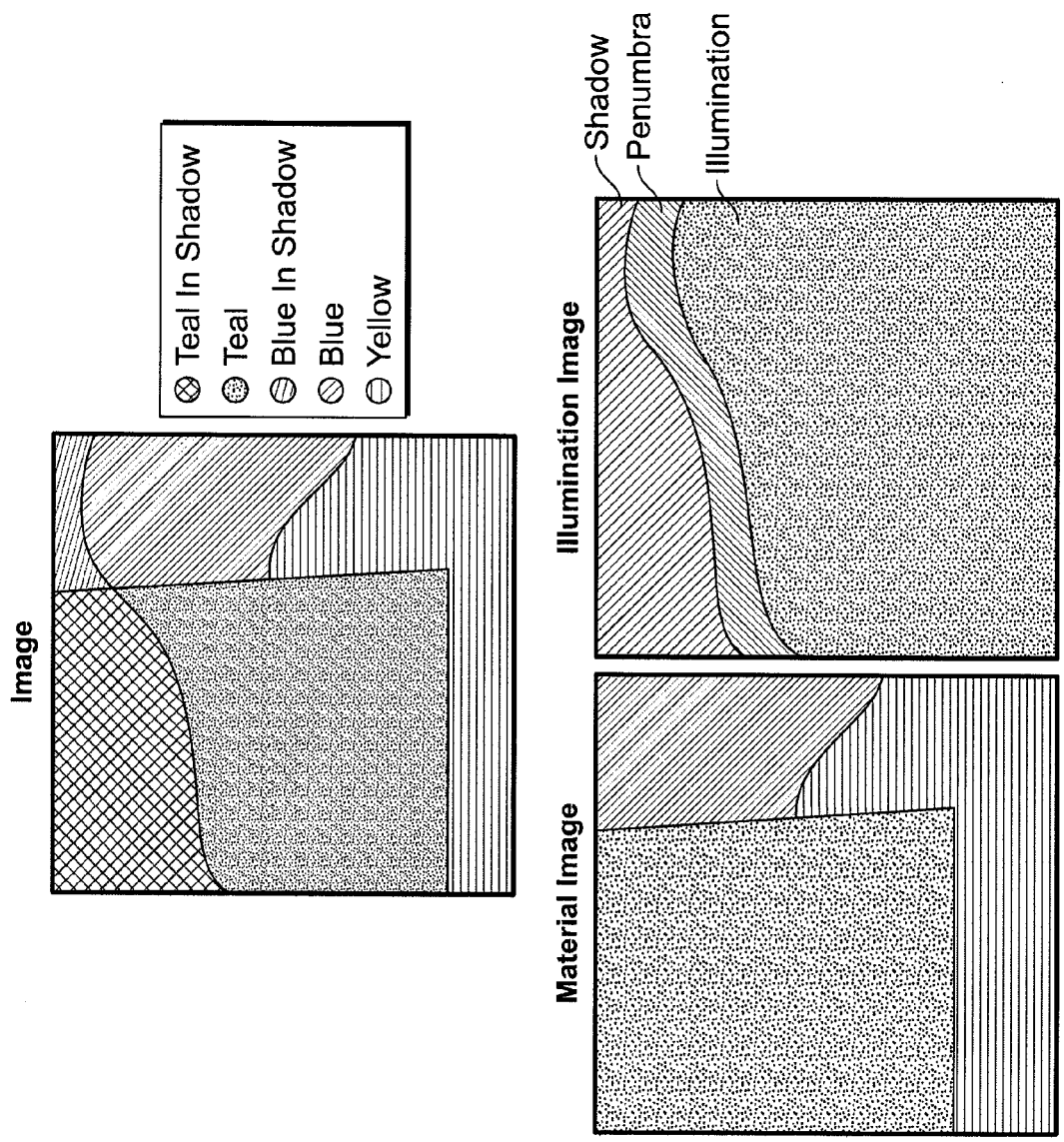
FIG. 14 illustrates intrinsic images including an illumination image and a material image corresponding to the original image of FIG. 3b.

Once the illumination values are known, the material color can be calculated by the CPU 12 using the I=ML equation. Intrinsic illumination and material images can be now be generated for the region defined by tokens a, b and c, by replacing each pixel in the original image by the calculated illumination values and material values, respectively. An example of an illumination image and material image, corresponding to the original image shown in FIG. 3b, is illustrated in FIG. 14.

Pursuant to an additional feature of the present invention, the accuracy of the segregation of an image into intrinsic material reflectance and illumination components is improved by concatenating additional constraints based upon spatial versus spectral orientation of the intrinsic components, in the [A][x]=[b] matrix equation. For example, constraints can be defined that simultaneously take into account both the spatial and spectral behavior of illumination change in an image. An optimization of the solution to the [A][x]=[b] matrix equation that includes constraints linked to spatial and spectral behavior, to, for example, determine the material reflectance of regions of the image, is based upon agreement between image data and a spatio-spectral illumination model, as well as a determination of a local expression of a spatial orientation and a spectral orientation of changes in the intrinsic components of the image (either material reflectance or illumination change), or a smooth combination of the two intrinsic components.

FIG. 13b shows graphic representation of each of a spatial orientation and a spectral orientation, relative to a point in the image, for example a pixel. As shown in the left-hand side of FIG. 13b, the spatial orientation for a selected pixel is expressed by a gradient comprising a first derivative for the selected pixel. The gradient is represented by a normal vector n, measured in terms of an orientation, $\theta_n$, the angle between the normal vector and the x-axis of the spatial xy-plane of the image, to indicate the direction normal to the local illumination variation expressed by the gradient. A corresponding orthogonal tangent direction t is calculated, defined by an angle $\theta_t$, more specifically, $\theta_n$ plus 90°.

Referring to the right-hand side of FIG. 13b, a spectral orientation in, for example, an RGB color space, can be represented by a BIDR orientation. As described above, a BIDR Model predicts that differing color measurement values fall within a cylinder in RGB space, from a dark end (in shadow) to a bright end (full light), when the color change is due to an illumination change forming a shadow over a single material of a scene depicted in the image. Thus, an orientation for illumination change relative to a spectral color space can be based upon the color variation predicted by a BIDR model.

FIG. 13c is a flow chart showing an exemplary embodiment of the present invention for creating constraints based upon spatial versus spectral orientation of intrinsic material reflectance and illumination components of an image. In step 800, an image file 18, for example, the input file 18 processed in the routines of FIGS. 6-12, described above, is input to the CPU 12.

In step 802, the CPU 12 operates to estimate normal and tangential spatial orientation information for illumination in the image, as shown on the left-hand side of FIG. 13b. A gradient is calculated for each selected image location, for example, a pixel, as shown by the dot in the left-hand side of FIG. 13b. For the purpose of writing constraints based upon spatial orientation information, the normal component of the direction of the estimated illumination gradient ($I_n$) for each selected image location is used to write constraints ($C_{nL}$) (step 804) such that the variation of the original image is constrained to appear in the final illumination image, and the orthogonal tangential direction ($I_t$) for each image location is used to write constraints ($C_t$) (step 806) such that the variation of the original image is constrained to appear in the final material reflectance image. The CPU 12 also defines a set of constraints ($C_{nR}$) wherein the derivative aligned with the normal direction is constrained to appear in the material reflectance image (step 810).

To implement execution of steps 802-810, based upon the geometry shown on the left-hand side of FIG. 13b, the derivative aligned with the normal direction, $I_n = I_x \cos\theta_n + I_y \sin\theta_n$, and the derivative aligned with the orthogonal tangential direction, $I_t = I_x \cos\theta_t + I_y \sin\theta_t$, wherein the discrete image derivatives aligned with the xy-plane of the image, $I_x$ and $I_y$, are computed, for example, by using simple forward differences:

$$I_x = I(x+1, y) - I(x, y) \text{ and } I_y = I(x, y+1) - I(x, y).$$

In order to estimate the normal and tangential directions of illumination variation ($\theta_n$ and $\theta_t$), for use in calculating the gradient directions ($I_n$ and $I_t$), advantage can be taken of the heuristic that illumination varies more smoothly than material reflectance by convolving the discrete image derivatives with a Gaussian filter kernel $G_\sigma$, as follows: $I_{x,\sigma} = G_\sigma * I_x$ and $I_{y,\sigma} = G_\sigma * I_y$, wherein the sigma for the Gaussian filter kernel, governing the amount of smoothness, is a parameter of the system set, for example, relative to the dimensions of the image.

For purposes of the above calculations, $\theta_n$ is computed based upon the color band with the largest gradient magnitude, b*, where:

$$b^* = \operatorname*{argmax}_{b} \sqrt{\left(I_{x,\sigma}^{(b)}\right)^2 + \left(I_{y,\sigma}^{(b)}\right)^2}$$

and $$\theta_n = \tan^{-1}\left(\frac{I_{y,\sigma}^{(b^*)}}{I_{x,\sigma}^{(b^*)}}\right)$$

Thus, according to the exemplary embodiment of the present invention, the tangentially-oriented derivatives, $I_t$, are constrained by the set of equations, $C_t$, to appear in the intrinsic material reflectance image, as noted above (thereby setting the corresponding tangential derivative for the illumination image to zero). Accordingly, the constraint $C_t$ causes image changes in the tangential direction to appear in the material reflectance image. Moreover, pursuant to a feature of the present invention, the normally-oriented derivatives, $I_n$, are evaluated relative to an illumination model, (steps 820-824), to determine the relative weights of the contribution by each of the intrinsic material reflectance component and the intrinsic illumination component to constraints based upon the normally-oriented derivatives ($C_{nL}$ and $C_{nR}$).

In this manner, in step 812, the CPU 12 can be operated to compute a weighted set of constraint equations $C_n$, to explain the normal derivative in terms of each of the material reflectance and illumination components of an image. The set of equations is defined as $C_n = w\, C_{nL} + (1-w)\, C_{nR}$ wherein w is a weight such that $w \in [0, 1]$, $C_{nR}$ represent a set of equations that constrain the normally-oriented derivatives, $I_n$, to appear in the material reflectance image (step 810), and $C_{nL}$ represent a set of equations that constrain the normally-oriented derivatives, $I_n$, to appear in the illumination image (step 804).

As will be described with reference to an example illustrated in FIG. 13e, the constraints can be defined relative to image locations such as, for example, Type C tokens, as identified by the CPU 12 via execution of the routine of FIG. 3a (step 814). The image locations can be any grouping of pixels, such as the exemplary Type C tokens, or the regions of uniform reflectance identified via the log-chromaticity clustering, as described above. In the exemplary embodiment of the present invention, the CPU 12 is provided with a map providing an indication (ID) for each pixel of the image being processed, to specify the pixel grouping to which the respective pixel belongs, for example, a Type C token or region of uniform reflectance identified via the log-chromaticity clustering. In the case of image locations defined by the individual pixels, a unique ID is assigned to each pixel in the map.

Regardless of the grouping used, the CPU 12 can be operated to loop over each pixel of the image and compare the ID for each individual pixel to the ID of a neighboring pixel. If the ID's are the same, then the two pixels are in the same group (for example, the same Type C token), and no entry is made in the constraint matrix for that current pixel, and so on. If the ID's are different, a new entry is made in the constraint matrix according to the described algorithm.

During a solve operation, the CPU 12 computes the laplacian [A] matrix, from the constraint matrix C, as A equals C-transpose times C. The rows (corresponding to pixels) of C that have the same ID are aggregated by the matrix multiplication, yielding an [A] matrix wherein all pixels having a same image location designation (for example, a Type C token or a region of uniform reflectance identified via the log-chromaticity clustering) are combined in the [A] matrix. Thus, the [A] matrix corresponds to constraints that have been aggregated to a chosen processing unit, for example Type C tokens or regions of uniform reflectance.

As noted above, in steps 820-824, the CPU 12 uses an illumination model to determine the weight w used to compute $C_n$ (step 812). A weight is calculated because it is not known a priori whether image variation aligned with the estimated illumination direction is due to material reflectance or illumination. A comparison to an illumination model that describes spatial and/or spectral illumination variation, is used to ascertain the extent to which the normally-oriented derivatives of image data, $I_n$, are constrained via a set of equations to appear in either one or the other of the final material reflectance or illumination images.

According to a feature of the present invention, the degree to which image data, aligned to the illumination orientation, agrees with the illumination model is measured as a quality of the fit, q, that can be converted to the weight w, using, for example, a soft threshold function, such as a sigmoid:

$$w(q)=1/(1+\exp(-\beta(q-q_{thresh})))$$

wherein $\beta$ and $q_{thresh}$ are parameters defining the softness and position of the threshold function, respectively.

Thus, when the fit quality is high, indicating that the image data match the spatial/spectral appearance of the illumination predicted by the illumination model, then, according to the threshold function, w→1, and $C_n$ will constrain the corresponding normal derivatives to appear in the illumination image. Conversely, in the case when the fit quality is low, w→0, and $C_n$ constrains the derivatives to appear in the material reflectance image. The convex combination according to the weighted constraint feature of the present invention allows for a smooth transition between the two extremes of w→1 and w→0, resulting in fewer artifacts in the intrinsic images, as can occur when a hard choice must made between constraining the normal derivatives strictly to either one or the other of the material reflectance image or the illumination image.

In step 820, illumination characteristics for use in evaluating the normally-oriented derivatives, $I_n$, relative to the illumination model, are estimated by the CPU 12. As noted above, according to an exemplary embodiment of the present invention, the illumination model is expressed as a BIDR model, and the illumination characteristics include local estimates of a BIDR spectral orientation. The CPU 12 can estimate BIDR spectral orientations via execution of any of the techniques described above relative to estimates for the normal for the log-chromaticity plane, for example, the use of linear tokens to estimate a characteristic spectral ratio indicative of the BIDR orientation. As noted above, each linear token provides a candidate local image region that likely corresponds to a set of pixels extending through a penumbra across a single material depicted in the image, as predicted by the BIDR model, and thus can be used to estimate a BIDR orientation, as illustrated in the right-hand side of FIG. 13b, for a local region of the image proximate to the respective linear token.

In step 822, the CPU 12 operates to fit each one of the local estimates for the BIDR orientation to respective pixels in the local area relevant to the corresponding local estimate, to ascertain fit quality information. According to an exemplary embodiment of the present invention, a BIDR spectral alignment model is used to fit each local estimate to corresponding image locations such as, for example, pixels.

In the BIDR spectral alignment model embodiment of the present invention, the CPU 12 computes the fit quality, q, by comparing the color of the normal derivative, $I_n$, at a pixel to the spectral orientation of the BIDR model, as estimated by the CPU 12 for the local area of the image proximate to the respective pixel. In an N band color image, for example, the RGB color space of the exemplary embodiment of the present invention, the color of each normal derivative $I_n$ is represented by an $N_{band}$-vector, as follows:

$$I_n = [I_n^{(R)} I_n^{(G)} I_n^{(B)}]^T.$$

A direction in color space for the vector, $I_n$, can be derived by dividing the vector by the magnitude of the vector, $\|I_n\|$. Since the BIDR orientation is also expressed as a unit vector L in a color space, the angle between the $I_n$ vector direction and the L vector (expressed as the dot product between the vector color space directions) can be used as a measure of the fit quality:

$$q=90°-\cos^{-1}(|(I_n/\|I_n\|) \cdot L \text{ vector}|).$$

Thus, when the color direction of the normal derivative for an image location is perfectly aligned with the estimate for BIDR orientation for the local region of the image relevant to the respective image location, the absolute value of the dot product between the vector color space directions is 1 and the resulting quality of fit, q, is maximized as q→90°. Accordingly, w→1, and $C_n$ for the image location will constrain the corresponding normal derivatives to appear in the illumination image. Conversely, when the color direction of the normal derivative is very different from the BIDR orientation, the dot product tends toward zero and the resulting fit quality is minimized as q→0°. In this case, w→0, and $C_n$ for the image location constrains the derivatives to appear in the material reflectance image.

In an additional exemplary embodiment of the present invention, step 822 is implemented as a BIDR profile model to fit each local estimate to corresponding image locations. FIG. 13d illustrates a model that fits image data for each of the red, green and blue bands of the normal derivatives in a manner to extend the analysis of the previous embodiment to include information on spatial variation. As shown in FIG. 13d, an illumination profile, p, for each color band of an image location, for example, a pixel, is calculated as a function of the spatial distance, d, along the $\theta_n$ direction.

In the additional embodiment of the present invention, each illumination profile is modeled by a parametric curve, with parameters shared across the RGB bands in a BIDR-specific way. For example, the model includes a set of sigmoid functions that are linked to provide a single model linking the parameters of each sigmoid to one another, across the color bands, forcing them to agree with the BIDR spectral orientation.

According to the additional embodiment of the present invention, the profiles for each of the red (R), green (G) and blue (B) profiles can be as follows:

$$p_R(d) = \alpha L\text{-vector orientation}_R/(1+\exp(-\gamma(d-d_{cen}))) + s_R$$

$$p_G(d) = \alpha L\text{-vector orientation}_G/(1+\exp(-\gamma(d-d_{cen}))) + s_G$$

$$p_B(d) = \alpha L\text{-vector orientation}_B/(1+\exp(-\gamma(d-d_{cen}))) + s_B$$

wherein: $d_{cen}$ is the center spatial position of the sigmoid, shared across the color bands;

$\gamma$ is the slope or steepness of the sigmoid (rate of change in intensity with respect to distance), shared across the color bands;

$\alpha$ is the position along the shared BIDR orientation, such that the difference between the flat bright and dark portions of the sigmoid in a color band, b, is L-vector orientation$_b$, and $s_{\{R, G, B\}}$ is the vertical shift (in intensity) required to align the sigmoid with the dark portion of the underlying data, in each color band.

Fitting the model, that is finding the six parameters $d_{cen}$, $\gamma$, $\alpha$ and $s_{\{R, G, B\}}$ that minimize the difference between the model and the image data (for example, in a least squares sense), is carried out by operating the CPU 12 to execute a non-linear optimization procedure, such as, for example, the Levenberg-Marquardt algorithm. Under the BIDR profile model embodiment of the present invention, a high fit quality requires the image data to match both the spectral orientation predicted by the BIDR model and the spatial profile predicted by the set of sigmoid functions. The fit quality, q, for a point in the image (for example, a pixel) having a set of profiles across the RGB color bands, P, can be defined to be inversely proportional to the residual between the fitted model and the image data, I.

For example, q can be set to equal as the root mean squared (RMS) error, as follows:

$$q = -\sqrt{\frac{1}{|\mathcal{P}|} \sum_{k \in \mathcal{P}} \sum_{b \in \{R,G,B\}} (p_b(d_k) - i_b(d_k))^2}$$

In step 824, the CPU 12 converts the fit quality, q, to the weight w, that is, in turn, used in step 812, as described above.

In step 816, the CPU 12 merges the tangential and normal constraints, $C_t$ and $C_n$, to output a set of oriented, spatio-spectral constraints C (step 818).

FIG. 13e shows an example of normal and tangential constraints written with respect to three Type C tokens, a, b and c (shown in FIG. 13e (i)). In the example illustrated in FIG. 13e (i), the orientations $\theta_n$ and $\theta_t$ are determined relative to a pixel at the center of Type C token a. The basic constraint matrix equation is shown in FIG. 13e (ii), wherein LHS is the left-hand side of each of the normal and tangential constraints and RHS is the right-hand side of each constraint, and r is the unknown material reflectance determined via a solution of the matrix equation. The basic equation explains the image-plane-aligned derivatives centered at token a, according to the local orientations $\theta_n$ and $\theta_t$.

In FIG. 13e (iii), there is an illustration of the corresponding detailed oriented, spatio-spectral constraint equation, based upon the normal and tangential constraints ($C_t$ and $C_n$), as described above, wherein $i_a$, $i_b$ and $i_c$ are the recorded color values in an image file 18, corresponding to the Type C tokens a, b and c, and $r_a$, $r_b$ and $r_c$ are the unknown material reflectance values for the Type C tokens a, b and c.

In general, when w→1 for a token, the RHS for the normally-oriented constraints is zero. Thus, any image variation appears in the illumination image since the reflectance is constrained to have no variation. When w→0, the RHS constrains the normally-oriented reflectance derivatives to match the corresponding image derivatives (indicating that the corresponding illumination variation is constrained to be zero at these image locations). These relationships reflect the basic equation that the image equals the material reflectance times the illumination. Thus, for example, if the illumination variation is zero, then all image variation occurs in the material reflectance, and so on. As noted above, the tangentially-oriented variation is always constrained to be in the material reflectance image.

Moreover, in the case when illumination orientation is not considered, and no illumination model is used in the analysis, then $\theta_n$→0, $\theta_t$→90° and w→0. Thus, the resulting matrix equation becomes an expression of simple, un-oriented, same illumination constraints, as shown in FIG. 13e (iv).

In a further exemplary embodiment of the present invention, the CPU 12 is operated to check the relationships between Type C tokens and the regions of uniform reflectance, as determined through execution of the routines of FIG. 3a and FIGS. 6-12, respectively, so as to write the normal and tangential constraints in a manner to confirm, for example, that the Type C tokens a, b and c are in fact in different regions of uniform reflectance, corresponding to a same-illumination constraint, to provide a more efficient execution of the normal and tangential constraint algorithm.

Implementation of the constraint/solver model according to the techniques and teachings of U.S. Pat. No. 8,139,867, utilizing the Type C tokens and Type B tokens obtained via a log-chromaticity clustering technique, and the constraints based upon spatial versus spectral orientation of the intrinsic components, according to features of the present invention, provides a highly effective and efficient method for generating intrinsic images corresponding to an original input image. The intrinsic images can be used to enhance the accuracy and efficiency of image processing, image analysis and computer vision applications.

However, the intrinsic images generated from the performance of the exemplary embodiments of the present invention can include artifacts that distort the appearance of a scene depicted in the image being processed. The artifacts can be introduced through execution of the intrinsic image generations methods of the present invention, or through user modifications such as the user input of image characteristics discussed above. Accordingly, according to a feature of the present invention, various post processing techniques can be implemented to reduce the artifacts.

Figure 15:
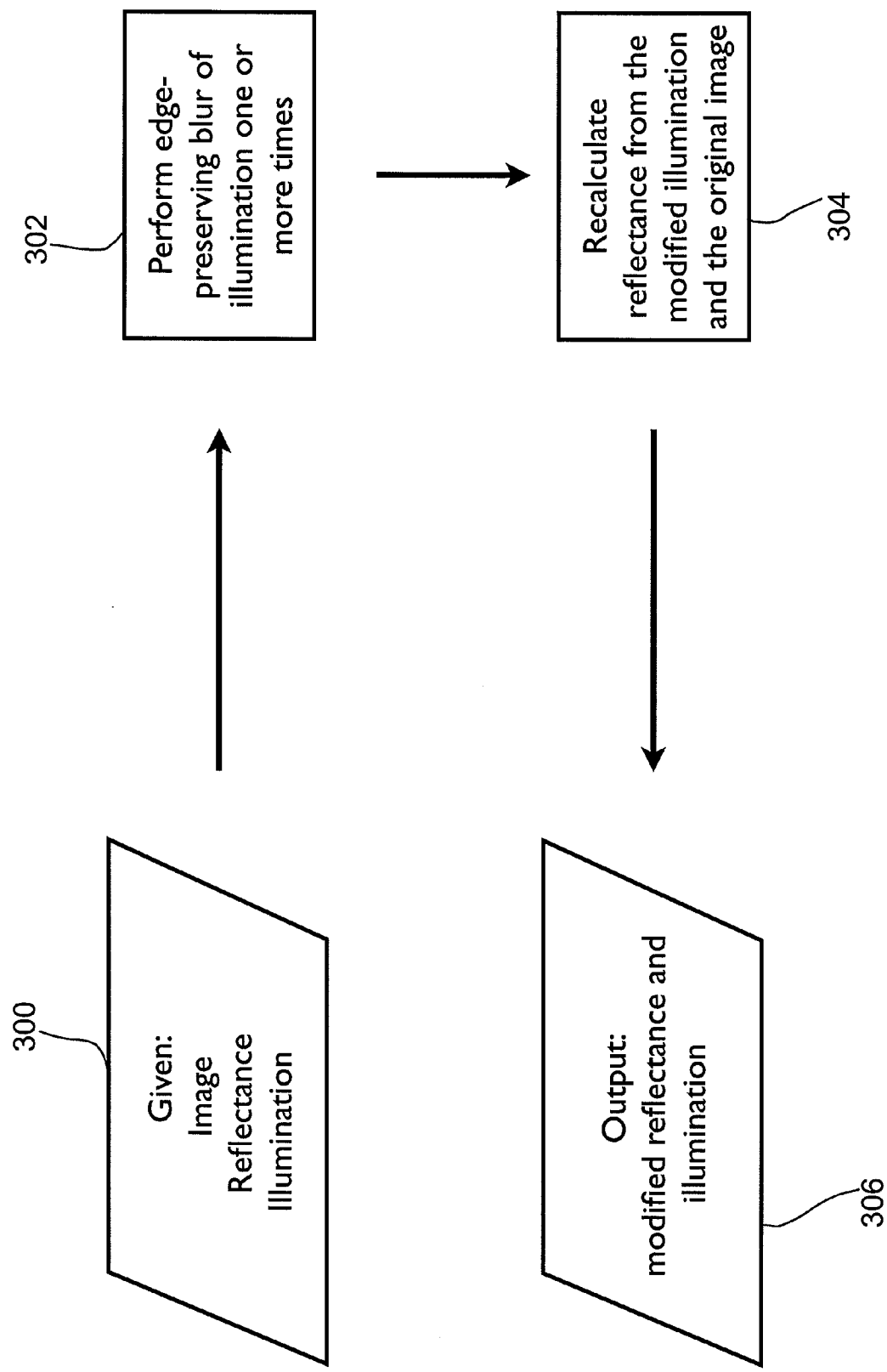
FIG. 15 is a flow chart for an edge preserving blur post processing technique applied to the intrinsic images illustrated in FIG. 14, according to a feature of the present invention.

FIG. 15 is a flow chart for an edge preserving blur post processing technique applied to the intrinsic images illustrated in FIG. 14, according to a feature of the present invention, to improve the quality of the illumination and material reflectance aspects depicted in the intrinsic images. In step 300, the CPU 12 receives as an input an original image (an image file 18), and the corresponding intrinsic material reflectance and illumination images determined by the CPU 12 through solution of the matrix equation shown in FIG. 13, as described above.

In step 302, the CPU 12 operates to perform an edge-preserving blur of the illumination in the illumination image by applying an edge preserving smoothing filter. The edge preserving smoothing filter can be any one of the known filters such as, for example, a bilateral filter, a guided filter, a mean-shift filter, a median filter, anisotropic diffusion and so on. The filter can be applied one or more times to the illumination image. In an exemplary embodiment, a bilateral filter is applied to the illumination image twice. In addition, several different types of filters can be applied in succession, for example, a median filter followed by a bilateral filter.

In step 304, the CPU 12 recalculates the intrinsic material reflectance image based upon the I=ML equation, and using the original image of the image file 18 and the illumination image, as modified in step 302. In step 306, the CPU 12 outputs intrinsic material reflectance and illumination images, as modified by the CPU 12 through execution of the routine of FIG. 15.

A smoothing filter applied to the illumination image results in several improvements to the appearance of the intrinsic images when used in, for example, such applications as computer graphics. For example, in computer graphics, texture mapping is used to achieve certain special effects. Artists consider it desirable in the performance of texture mapping to have some fine scale texture form the illumination in the material reflectance image. By smoothing the illumination image, in step 302, the fine scale texture is moved to the material reflectance image upon a recalculation of the material image in step 304, as will be described below.

In addition, smoothing the illumination in step 302 places some of the shading illumination (illumination intensity variation due to curvature of a surface) back into the material reflectance image, giving the material image some expression of curvature. That results in an improved material depiction more suitable for artistic rendering in a computer graphics application.

Moreover, small reflectance variation sometimes erroneously ends up in the illumination image. The smoothing in step 302 forces the reflectance variation back into the material image.

Figure 16:
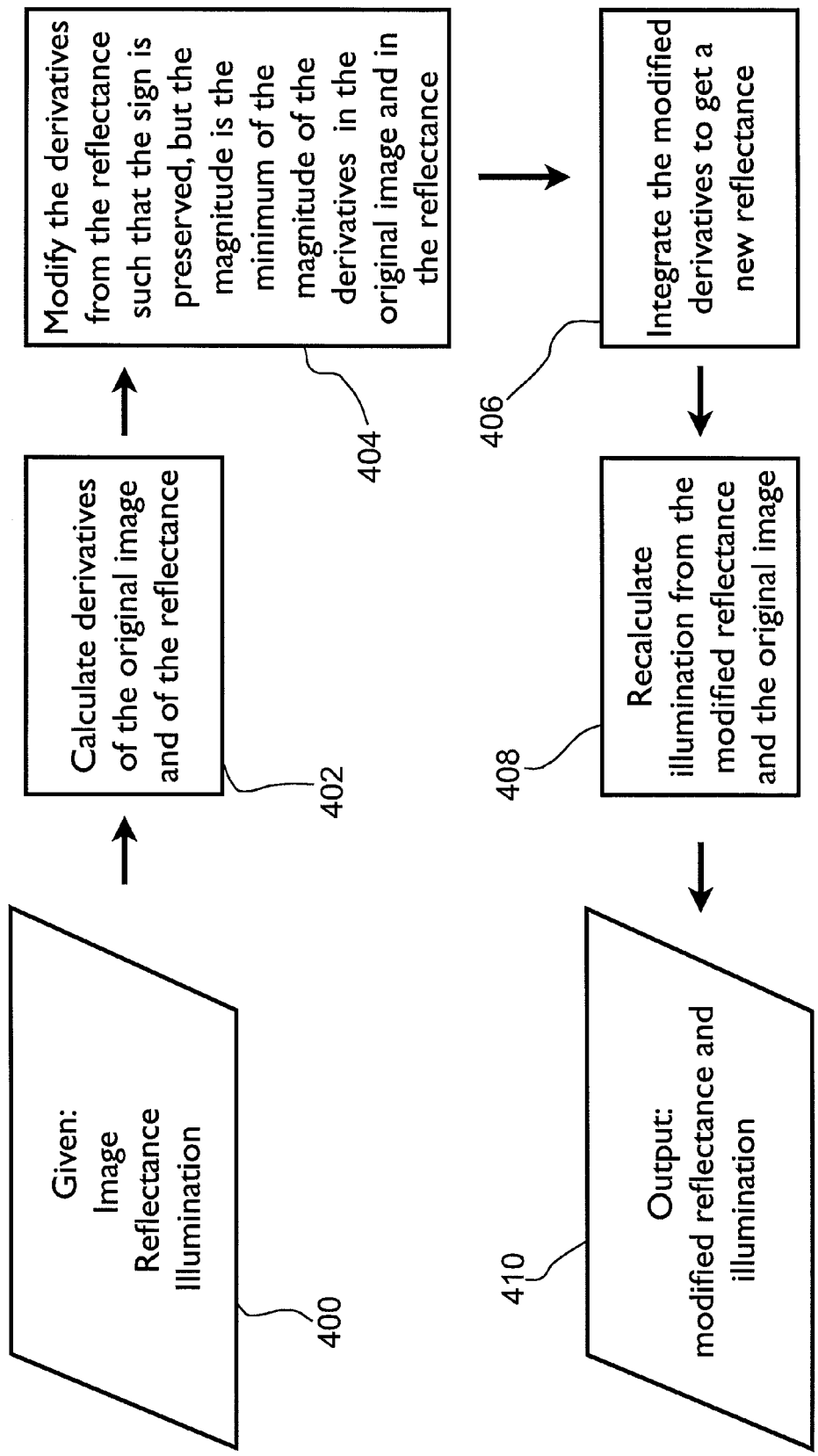
FIG. 16 is a flow chart for an artifact reduction post processing technique applied to the intrinsic images illustrated in FIG. 14, according to a feature of the present invention.

FIG. 16 is a flow chart for an artifact reduction post processing technique applied to the intrinsic images illustrated in FIG. 14, according to a feature of the present invention, to improve the quality of the illumination and material reflectance aspects depicted in the intrinsic images. In step 400, the CPU 12 receives as an input an original image (an image file 18), and the corresponding intrinsic material reflectance and illumination images determined by the CPU 12 through solution of the matrix equation shown in FIG. 13, as described above. Optionally, the intrinsic images can be previously modified by the CPU 12 through execution of the routine of FIG. 15.

In step 402, the CPU 12 operates to calculate derivatives (the differences between adjacent pixels) for the pixels of each of the original image and the material reflectance image. Variations between adjacent pixels, in the horizontal and vertical directions, are caused by varying illumination and different materials in the scene depicted in the original image. When the CPU 12 operates to factor the original image into intrinsic illumination and material reflectance images, some of the variation ends up in the illumination image and some ends up in the material reflectance image. Ideally, all of the variation in the illumination image is attributable to varying illumination, and all of the variation in the material reflectance image is attributable to different materials.

Thus, by removing the illumination variation, variations in the material reflectance image should be strictly less than variations in the original image. However, inaccuracies in the process for generating the intrinsic images can result in new edges appearing in the material reflectance image.

In step 404, the CPU 12 operates to identify the artifacts caused by the newly appearing edges by comparing the derivatives for the material reflectance image with the derivatives for the original image. The CPU 12 modifies the derivatives in the material reflectance image such that, for each derivative of the material reflectance image, the sign is preserved, but the magnitude is set at the minimum of the magnitude of the derivative in the original image and the material reflectance image. The modification can be expressed by the following equation:

derivativeReflectanceNew=min(abs(derivativeReflectanceOld), abs(derivativeOriginalimage))*sign(derivativeReflectanceOld)

In step 406, the CPU integrates the modified derivatives to calculate a new material reflectance image. The new image is a material reflectance image without the newly appearing, artifact-causing edges. Any known technique can be implemented to perform the integration. For example, the CPU 12 can operate to perform numerical 2D integration by solving the 2D Poisson equation using discrete cosine transforms.

In step 408, the CPU 12 recalculates the intrinsic illumination image based upon the I=ML equation, and using the original image of the image file 18 and the material reflectance image, as modified in steps 404 and 406. In step 408, the CPU 12 outputs intrinsic material reflectance and illumination images, as modified by the CPU 12 through execution of the routine of FIG. 16.

Figure 17:
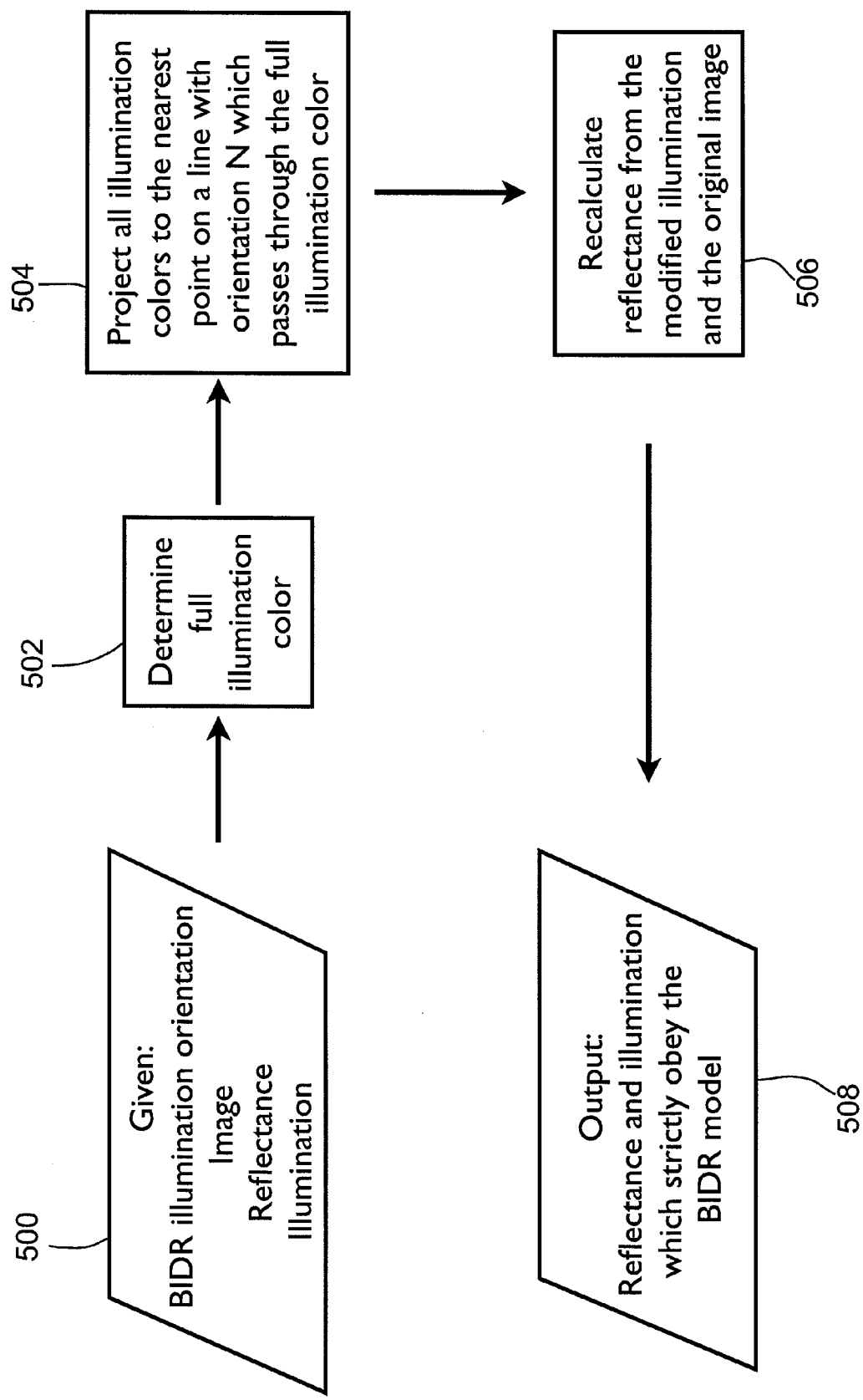
FIG. 17 is a flow chart for a BIDR model enforcement post processing technique applied to the intrinsic images illustrated in FIG. 14, according to a feature of the present invention.

FIG. 17 is a flow chart for a BIDR model enforcement post processing technique applied to the intrinsic images illustrated in FIG. 14, according to a feature of the present invention, to improve the quality of the illumination and material reflectance aspects depicted in the intrinsic images.

As described above, the BIDR model predicts the correct color for a material, in a shadow penumbra, from full shadow to fully lit. As shown in FIG. 18, according to the prediction of the BIDR model, colors for a material, for example, in an RGB color space, from a fully shaded color value to a fully lit color value, generally form a line in the color space. In full shadow, the material is illuminated by an ambient illuminant, while when fully lit, the material is illuminated by the ambient illuminant and the direct or incident illuminant present in the scene at the time the digital image of an image file 18 was recorded.

According to the BIDR model, the illumination values in an image also define a line extending from the color of the ambient illuminant to the color of the combined ambient and direct illuminants. In log color space, the illumination line predicted by the BIDR model corresponds to the normal, N of the log color space chromaticity plane illustrated in FIG. 5.

Various inaccuracies in the generation of the illumination and material intrinsic images, as described above, can also result, for example, in illumination values in the generated intrinsic illumination image that diverge from the line for the illumination values predicted by the BIDR model. According to the present invention, the illumination line prediction of the BIDR model is used to correct such inaccuracies by modifying the illumination to be linear in log(RGB) space.

Referring once again to FIG. 17, in step 500, the CPU 12 receives as input a BIDR illumination orientation, corresponding to the normal N illustrated in FIG. 5. In the exemplary embodiment of the present invention, N is determined by the CPU 12 through execution of the routines of FIG. 7*a-h*, as described above. In that case, the N determined through execution of the routines of FIG. 7*a-h* is used in both the clustering process described above, and in the BIDR model enforcement post processing technique illustrated in FIG. 17.

In the event the illumination and material reflectance images are generated via a method different from the log-chromaticity clustering technique of the exemplary embodiment, the orientation N is determined by the CPU 12 in a separate step before the execution of the routine of FIG. 17, through execution of the routines of FIG. 7a-h. When N is determined in a separate step, the CPU 12 can operate relative to either the original image or the illumination image. In addition, when the processing is based upon a user input, as described above, the user can make a selection from either the original image or the illumination image.

Moreover, in step 500, the CPU 12 also receives as input an original image (an image file 18), and the corresponding intrinsic material reflectance and illumination images determined by the CPU 12 through solution of the matrix equation shown in FIG. 13, also as described above. Optionally, the intrinsic images can be previously modified by the CPU 12 through execution of the routine(s) of either one, or both FIGS. 15 and 16.

In step 502, the CPU 12 determines the full illumination color in the illumination image. The full illumination color (ambient+direct) can be the brightest color value depicted in the illumination image. However, the brightest value can be inaccurate due to noise in the image or other outliers. In a preferred exemplary embodiment of the present invention, a more accurate determination is made by finding all illumination color values in a preselected range of percentiles of the intensities, for example, the $87^{th}$ through $92^{nd}$ percentiles, and calculating an average of those values. The average is used as the full illumination color value. Such an approach provides a robust estimate of the bright end of the illumination variation in the intrinsic illumination image.

In step 504, the CPU 12 operates to modify all of the pixels of the illumination image by projecting all of the illumination colors depicted by the pixels in the illumination image to the nearest point on a line having the orientation N (input to the CPU 12 in step 500) and passing through the full illumination color determined in step 302. Thus, the color of each pixel of the illumination image is modified to conform to the closest value required by the BIDR model prediction.

A special case exists for the pixels of the illumination image having an intensity that is greater than the full illumination color value, as calculated in step 502. The special case can be handled by the CPU 12 according to a number of different methods. In a first method, the modification is completed as with all the other pixels, by projecting each high intensity pixel to the nearest value on the illumination line. In a second method, each high intensity pixel is replaced by a pixel set at the full illumination color value. According to a third method, each high intensity pixel is kept at the color value as in the original image.

An additional method is implemented by using a weighted average for each high intensity pixel, of values determined according to the first and third methods, or of values determined according to the second and third methods. The weights would favor values calculated according to either the first or second methods when the values are similar to high intensity pixels that are not significantly brighter than the full illumination color value calculated in step 502. Values calculated via the third method are favored when values for high intensity pixels that are significantly brighter than the full illumination color value. Such a weighting scheme is useful when the I=ML equation for image characteristics is inaccurate, for example, in the presence of specular reflections.

Any known technique can be implemented to determine the relative weights for illumination values. In an exemplary embodiment of the present invention, a sigmoid function is constructed such that all the weight is on the value determined either according to the first or second methods, when the intensity of the high intensity pixel is at or near the full illumination color value, with a smooth transition to an equally weighted value, between a value determined either according to the first or second methods and a value determined according to the third method, as the intensity increases. That is followed by a further smooth transition to full weight on a value determined according to the third method, as the intensity increase significantly beyond the full illumination color value.

In step 506, the CPU 12 recalculates the intrinsic material reflectance image based upon the I=ML equation, and using the original image of the image file 18 and the illumination image, as modified in step 504. In step 508, the CPU 12 outputs intrinsic material reflectance and illumination images modified to strictly adhere to the predictions of the BIDR model.

For best results, the above-described post processing techniques can be executed in a log(RGB) space. Also, the various techniques can be executed in the order described above. Once one or more of the post processing techniques have been executed, the final modified intrinsic images can be white balanced and/or scaled, as desired, and output by the CPU 12.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image represented in a spatial plane;
   organizing spatio-spectral information for the image in a matrix equation expressed by normal and tangential constraints determined as a function of a spatial orientation of selected image locations, relative to the spatial plane of the image; and
   utilizing the matrix equation to solve for an intrinsic image corresponding to the image.

2. The method of claim 1 wherein the tangential constraints represent color change in an intrinsic material reflectance image and the normal constraints represent color change in each of the intrinsic material reflectance image and an intrinsic illumination image.

3. The method of claim 2 including the additional step of computing a weight to define the relative contribution of the normal constraints to each of the intrinsic material reflectance image and an intrinsic illumination image.

4. The method of claim 3 wherein the additional step of computing a weight is carried out by computing the weight as a function of a quality fit relative to an illumination model.

5. The method of claim 4 wherein the illumination model is based upon a BIDR model.

6. The method of claim 1 wherein the spatial orientation is based upon local image gradients.

7. The method of claim 1 wherein the image locations comprise pixels.

8. The method of claim 1 wherein the image locations comprise tokens.

9. The method of claim 1 wherein the image locations comprise regions of uniform reflectance.

10. The method of claim 1 wherein the intrinsic image comprises a material reflectance image.

11. The method of claim 1 wherein the intrinsic image comprises an illumination image.

12. A computer system which comprises:
a CPU; and
a memory storing an image file providing an image represented in a spatial plane;
the CPU arranged and configured to execute a routine to organize spatio-spectral information for the image in a matrix equation expressed by normal and tangential constraints determined as a function of a spatial orientation of selected image locations, relative to the spatial plane of the image and utilize the matrix equation to solve for an intrinsic image corresponding to the image.

13. The computer system of claim 12 wherein the tangential constraints represent color change in an intrinsic material reflectance image and the normal constraints represent color change in each of the intrinsic material reflectance image and an intrinsic illumination image.

14. A computer program product, disposed on a non-transitory computer readable media, the product including computer executable process steps operable to control a computer to: provide an image represented in a spatial plane, organize spatio-spectral information for the image in a matrix equation expressed by normal and tangential constraints determined as a function of a spatial orientation of selected image locations, relative to the spatial plane of the image and utilize the matrix equation to solve for an intrinsic image corresponding to the image.

15. The computer program product of claim 14 wherein the tangential constraints represent color change in an intrinsic material reflectance image and the normal constraints represent color change in each of the intrinsic material reflectance image and an intrinsic illumination image.

16. The computer program product of claim 15 including the additional process step to compute a weight to define the relative contribution of the normal constraints to each of the intrinsic material reflectance image and an intrinsic illumination image.

17. The computer program product of claim 16 wherein the additional process step to compute a weight is carried out by a process step to compute the weight as a function of a quality fit relative to an illumination model.

18. The computer program product of claim 17 wherein the illumination model is based upon a BIDR model.

19. The computer program product of claim 14 wherein the spatial orientation is based upon local image gradients.

20. The computer program product of claim 14 wherein the image locations comprise pixels.

21. The computer program product of claim 14 wherein the image locations comprise tokens.

22. The computer program product of claim 14 wherein the image locations comprise regions of uniform reflectance.

23. The computer program product of claim 14 wherein the intrinsic image comprises a material reflectance image.

24. The computer program product of claim 14 wherein the intrinsic image comprises an illumination image.

* * * * *